United States Patent
Watanabe et al.

(10) Patent No.: US 11,243,343 B2
(45) Date of Patent: Feb. 8, 2022

(54) BACKLIGHT UNIT AND LIQUID CRYSTAL DISPLAY DEVICE

(71) Applicant: FUJIFILM Corporation, Tokyo (JP)

(72) Inventors: Shinya Watanabe, Minami-ashigara (JP); Megumi Sekiguchi, Minami-ashigara (JP); Yujiro Yanai, Minami-ashigara (JP); Naoyoshi Yamada, Minami-ashigara (JP); Yukito Saitoh, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 199 days.

(21) Appl. No.: 16/808,070

(22) Filed: Mar. 3, 2020

(65) Prior Publication Data
US 2020/0200961 A1 Jun. 25, 2020

Related U.S. Application Data

(63) Continuation of application No. PCT/JP2018/032594, filed on Sep. 3, 2018.

(30) Foreign Application Priority Data

Sep. 4, 2017 (JP) .............................. JP2017-169666
Nov. 30, 2017 (JP) .............................. JP2017-230210
May 17, 2018 (JP) .............................. JP2018-095610

(51) Int. Cl.
*F21V 8/00* (2006.01)
*G02B 3/00* (2006.01)

(52) U.S. Cl.
CPC .......... *G02B 6/0053* (2013.01); *G02B 3/0056* (2013.01)

(58) Field of Classification Search
CPC .......... G02F 1/133607; G02F 1/133606; G02F 1/133502
See application file for complete search history.

(56) References Cited

U.S. PATENT DOCUMENTS

2007/0252923 A1 11/2007 Hwang et al.
2013/0265774 A1* 10/2013 Umeda ............. G02F 1/133504
362/311.01
(Continued)

FOREIGN PATENT DOCUMENTS

JP 10-253808 A 9/1998
JP 2007-299755 A 11/2007
(Continued)

OTHER PUBLICATIONS

Huang et al., "Integrated backlight module to provide a collimated and uniform planar light source," Applied Optics, vol. 55, No. 26, Sep. 10, 2016, pp. 7307-7313.
(Continued)

*Primary Examiner* — William J Carter
(74) *Attorney, Agent, or Firm* — Birch, Stewart, Kolasch & Birch, LLP.

(57) ABSTRACT

Display performance can be improved by reducing light leak in an oblique direction at the time of black display while increasing front brightness. Provided is a backlight unit including: a light collimating member in which a lens array is formed on one surface of a transparent substrate and a plurality of truncated cones are arranged on another surface of the transparent substrate; a light guide plate; and a light source, in which the truncated cone on the light collimating member has a shape in which a width decreases away from the transparent substrate in a height direction, a position of each of lenses of the lens array deviates from a position of the truncated cone corresponding to the lens to move away from the light source in a direction that connects a center of the lens and the light source most adjacent to the lens, an
(Continued)

optical axis of the lens is arranged to pass through a slope of the truncated cone corresponding to the lens, the light guide plate and a surface of the truncated cone opposite to the transparent substrate are in contact with each other, and the shape of the truncated cone of the light collimating member satisfies specific expressions.

12 Claims, 11 Drawing Sheets

(56) References Cited

U.S. PATENT DOCUMENTS

| | | | |
|---|---|---|---|
| 2014/0253844 A1* | 9/2014 | Yamamoto | G02B 6/0056 349/64 |
| 2016/0139453 A1* | 5/2016 | Yui | G02B 5/0263 359/599 |
| 2016/0139454 A1* | 5/2016 | Katsuta | G02B 5/0278 359/599 |

FOREIGN PATENT DOCUMENTS

| | | |
|---|---|---|
| JP | 2009-162843 A | 7/2009 |
| JP | 2014-67524 A | 4/2014 |

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2018/032594, dated Mar. 19, 2020, with English translation.
International Search Report (Form PCT/ISA/210) for International Application No. PCT/JP2018/032594, dated Nov. 13, 2018, with English translation.
Nakamura et al., "Optical design of front diffuser for collimated backlight and front diffusing system," IDW, LIT2/FMC2—2, 2011, pp. 475-478.
Takemoto et al., "36.3: Analysis of Depolarized Light-Scattering in LCD Panel and Proposal of LCD Systems for Enhancing Contrast Ratio," SID 09 Digest, 2009, pp. 514-517.

* cited by examiner

OPTICAL AXIS OF LENS
LINE PERPENDICULAR TO TRAPEZOIDAL CONE $\theta$ ave REPRESENTS AVERAGE VALUE OF INCLINATION
ANGLES $\theta 1'$, $\theta 2'$, $\cdots$, AND $\theta m'$ OF TRAPEZOIDAL CONE WITH
RESPECT TO RESPECTIVE INCIDENCE ANGLES $\theta 1$, $\theta 2$, $\cdots$, $\theta m$

LINE PERPENDICULAR TO TRAPEZOIDAL CONE      OPTICAL AXIS OF LENS

BACKLIGHT UNIT AND LIQUID CRYSTAL DISPLAY DEVICE

CROSS-REFERENCE TO RELATED APPLICATIONS

This application is a Continuation of PCT International Application No. PCT/JP2018/032594 filed on Sep. 3, 2018, which claims priority under 35 U.S.C. § 119(a) to Japanese Patent Application No. 2017-169666, filed on Sep. 4, 2017, Japanese Patent Application No. 2017-230210, filed on Nov. 30, 2017 and, Japanese Patent Application No. 2018-095610, filed on May 17, 2018. Each of the above applications is hereby expressly incorporated by reference, in its entirety, into the present application.

BACKGROUND OF THE INVENTION

1. Field of the Invention

The present invention relates to a backlight unit and a liquid crystal display device including the backlight unit.

2. Description of the Related Art

A liquid crystal display device has been more widely used as a space-saving image display device having low power consumption. For example, the liquid crystal display device has a configuration in which a backlight unit, a backlight-side polarizing plate, a liquid crystal panel, and a visible-side polarizing plate are provided in this order.

As the backlight unit, for example, an edge light mode (also referred to as "side light mode") and a direct backlight mode are known, the edge light mode including a light guide plate and a light source that is arranged on an edge surface (side surface) of the light guide plate, in which light incident into from the light source into the edge surface is guided and emitted from the entire main surface to a liquid crystal panel, and a direct backlight mode having a structure in which a light source is arranged immediately below a liquid crystal panel without using a light guide plate and light is emitted to a liquid crystal panel. Further, for example, a diffusion sheet and a light condensing sheet that condenses light in a normal direction (front direction) of a liquid crystal panel main surface are provided on the backlight unit.

Light emitted from the backlight unit and passed through the diffusion sheet and/or the light condensing sheet has a brightness distribution in a polar angle direction. Therefore, light is incident into a liquid crystal cell in an oblique direction. The liquid crystal cell has viewing angle dependence, and transmittance of light incident into the liquid crystal cell in an oblique direction at the time of black display increases. As a result, in a case where the liquid crystal display device is seen from an oblique direction at the time of black display, the brightness increases, which leads to a decrease in image quality. In particular, recently, a display device (OLED) including an organic EL having excellent display performance at the time of black display has been widely used, and it is desirable to further reduce the brightness of the liquid crystal display device at the time of black display.

As a method for solving the above-described problem, a configuration in which the contrast in an oblique direction is improved by collimating light incident into the liquid crystal panel and scattering light after the passage of the light through the liquid crystal cell (SID2009 DIGEST 514 to 517 and IDW 2011 475 to 478). In addition, in order to collimate light emitted from the backlight unit, a light collimating member described in PTL 1: JP1998-253808A (JP-H10-253808A) and Applied Optics, Vol. 55, No. 26, 7307 to 7313 (2016) is disclosed.

In addition, JP2009-162843A discloses a lens sheet consisting of a light-transmitting substrate having one surface on which a first lens array is formed and having a back surface on which a second lens array is formed. The second lens array is formed of a pattern having, as one period, a form where one or a plurality of lenses are interposed between substantially flat surfaces having a width s. Periods of the first lens array and the second lens array match each other, and a phase shift thereof is substantially 0 or substantially half of the period.

SUMMARY OF THE INVENTION

JP1998-253808A (JP-H10-253808A) discloses a light collimating member including a trapezoidal small solid and a lens that are provided on a transparent substrate, in which light advancing in the front direction is condensed and collimated. However, JP1998-253808A (JP-H10-253808A) does not describe the brightness of light emitted from the light collimating member in an oblique direction, the light collimating member affecting an increase in brightness of a liquid crystal cell in an oblique direction at the time of black display. In addition, since the ratio of the area in contact with the light guide plate of the small solid is low, the light extraction efficiency decreases, and thus there is a problem in that the brightness decreases.

Applied Optics, Vol. 55, No. 26, 7307 to 7313 (2016) discloses that light is collimated by providing an optical sheet on a light guide plate, the optical sheet having a structure in which a truncated cone is formed on one surface of a transparent substrate and a lens shape is formed on another surface of the transparent substrate. However, the above-described configuration has a problem in that a part of light incident from the light guide plate into a slope of the truncated cone leaks from the slope without being fully reflected, which leads to an increase in brightness in a case where the liquid crystal display device is seen from an oblique direction at the time of black display.

The present invention has been in consideration of the above-described circumstances, and an object thereof is to provide a backlight unit including a light collimating member that reduces brightness in an oblique direction while increasing front brightness. Another object of the present invention is to provide a backlight unit including a light collimating member that reduces light leak in an oblique direction at the time of black display and improves display performance while increasing front brightness of a liquid crystal display device. In addition, still another object of the present invention is to provide a liquid crystal display device that includes the backlight unit including the light collimating member so as to improve contrast.

According to the present invention, there is provided a backlight unit comprising: a light collimating member in which a lens array is formed on one surface of a transparent substrate and a plurality of truncated cones are arranged on another surface of the transparent substrate; a light guide plate; and a light source, in which the light collimating member is arranged to face one main surface of the light guide plate, the light source is arranged to face at least one side surface of the light guide plate, the truncated cone on the light collimating member has a shape in which a width decreases away from the transparent substrate in a height direction, a position of each of lenses of the lens array deviates from a position of the truncated cone corresponding to the lens to move away from the light source in a direction that connects a center of the lens and the light source most adjacent to the lens, an optical axis of the lens is arranged to pass through a slope of the truncated cone corresponding to the lens, the light guide plate and a surface of the truncated cone opposite to the transparent substrate are in contact with each other, and a shape of the truncated cone of the light collimating member satisfies the following Expressions 1 to 3.

$$\frac{n2}{n1} \geq 1.03 \quad \text{Expression 1}$$

$$\theta ave - 10° \leq \theta \leq \theta ave + 10° \quad \text{Expression 2}$$

$$0.05 \leq \frac{r}{R} \leq 0.50 \quad \text{Expression 3}$$

In the expressions, n1 represents a refractive index of the light guide plate, n2 represents a refractive index of the truncated cone, θave represents a value represented by the following Expression 4, m in Expression 4 represents a division number of an incidence angle range of light incident from the light guide plate into the truncated cone, θi represents an i-th incidence angle in a case where the incidence angle range of the light incident from the light guide plate into the truncated cone is divided m times, θ represents an inclination angle of the truncated cone, R represents a radius of the lens on the transparent substrate side, and r represents a radius of the surface of the truncated cone opposite to the transparent substrate.

$$\theta ave = \frac{1}{m} \sum_{i=1}^{m} \left( 90 - \frac{1}{2} \cdot \frac{n1}{n2} \sin^{-1} \theta i \right) \quad \text{Expression 4}$$

In the present invention it is preferable that the shape of the truncated cone of the light collimating member satisfies the following Expressions 5 and 6.

$$\theta ave-5° \leq \theta \leq \theta ave+5° \quad \text{Expression 5}$$

$$0.15 \leq \frac{r}{R} \leq 0.42 \quad \text{Expression 6}$$

In the light collimating member included in the backlight unit according to the present invention, it is preferable that a distance L between the optical axis of the lens and a line perpendicular to the truncated cone satisfies the following Expression 7.

$$r \leq L \leq r + \frac{1}{2} \cdot \frac{h}{\tan \theta} \quad \text{Expression 7}$$

In the expression, θ represents an inclination angle of the truncated cone, h represents a height of the truncated cone, and r represents a radius of the surface of the truncated cone opposite to the transparent substrate.

In a case where a thickness of the transparent substrate of the light collimating member is represented by d and a focal length of the lens is represented by f, it is preferable that Expression 8 is satisfied.

$$d \leq f \leq d+h, \quad \text{Expression 8}$$

In the expression, h represents a height of the truncated cone.

It is preferable that a light absorbing layer having an opening is provided between the truncated cone and the lens in the light collimating member, and it is preferable that a center of the opening of the light absorbing layer and a position of the optical axis of the lens match each other.

It is preferable that the opening of the light absorbing layer is circular and a diameter Rb of the opening satisfies Expression 9.

$$0.15 < Rb/R \leq 1.0 \quad \text{Expression 9}$$

It is preferable that the light guide plate and the surface of the truncated cone opposite to the transparent substrate are in contact with each other through an adhesive layer.

It is preferable that a truncated conical or conical protrusion having a smaller inclination angle than the truncated cone is provided on the surface of the truncated cone of the light collimating member opposite to the transparent substrate, and it is preferable that a radius of a surface of the protrusion on the truncated cone side is equal to the radius of the surface of the truncated cone opposite to the transparent substrate.

It is preferable that a plurality of lenses are randomly arranged.

It is preferable that a light deflection member is arranged on a visible side further than the light collimating member.

It is preferable that the light deflection member is a prism sheet.

According to the present invention, there is provided a liquid crystal display device comprising: a liquid crystal display element; and the backlight unit according to the present invention.

According to the present invention, there is provided a backlight unit comprising: a light collimating member in which a lens array is formed on one surface of a transparent substrate and a plurality of truncated cones are arranged on another surface of the transparent substrate; a light guide plate; and a light source, in which the light collimating member is arranged to face one main surface of the light guide plate, the light source is arranged to face at least one side surface of the light guide plate, the truncated cone on the light collimating member has a shape in which a width decreases away from the transparent substrate in a height direction, a position of each of lenses of the lens array deviates from a position of the truncated cone corresponding to the lens to move away from the light source in a direction that connects a center of the lens and the light source most adjacent to the lens, an optical axis of the lens is arranged to deviate in one direction and to pass through a slope of the truncated cone corresponding to the lens, the light guide plate and a surface of the truncated cone opposite to the transparent substrate are in contact with each other, and a relationship between a refractive index n1 of the light guide plate and a refractive index n2 of the truncated cone satisfies n2>n1. Therefore, light incident from the light guide plate into the truncated cone is refracted on an interface of a lower surface of the truncated cone, and light incident into the slope of the truncated cone can be efficiently fully reflected. By controlling the shape of the truncated cone to satisfy Expression 2, light fully reflected from the slope of the truncated cone can be made to advance in a direction of about ±40° with respect to a front direction (a direction of an azimuthal angle of 0° and a polar angle of 0° in a case where a normal direction of the main surface of the light collimating member is 0°). Light fully reflected from the slope of the truncated cone can be converted into parallel light using the lens. Therefore, light having high parallelism can be emitted in the front direction. By satisfying Expressions 1 and 2, light leaked from the slope of the truncated cone can be significantly suppressed, and thus light advancing in an oblique direction can be suppressed. As a result, an increase in brightness in a case where the liquid crystal display device is seen from an oblique direction at the time of black display can be suppressed. Further, by satisfying Expression 3, light extraction efficiency from the light guide plate can be improved, and thus brightness in the front direction can be increased.

DESCRIPTION OF THE PREFERRED EMBODIMENTS

Hereinafter, an embodiment of a backlight unit and a liquid crystal display device according to the present invention will be described in detail with reference to the drawings.

In this specification, unless specified otherwise, numerical ranges represented by "to" include numerical values before and after "to" as lower limit values and upper limit values.

Figure 1:
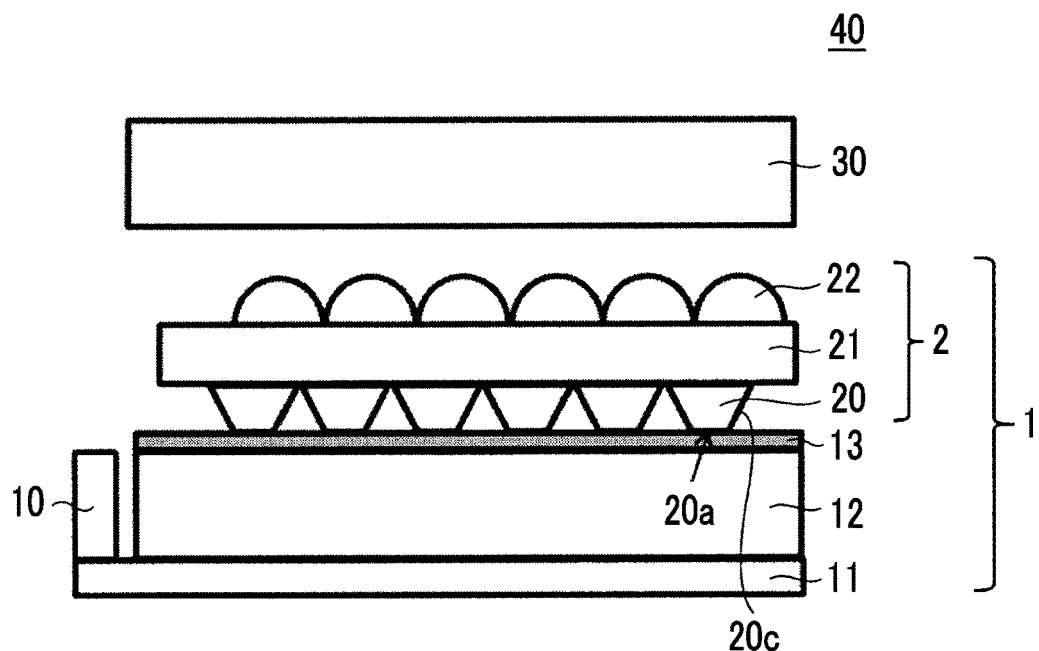
FIG. 1 is a schematic cross-sectional view illustrating a schematic configuration of a liquid crystal display device 40 according to one embodiment of the present invention.

FIG. 1 is a cross-sectional view illustrating a schematic configuration of a liquid crystal display device 40 according to one embodiment of the present invention.

The liquid crystal display device 40 includes: a backlight unit 1 according to a first embodiment of the present invention that includes a light source 10, a light guide plate 12, and a light collimating member 2; and a liquid crystal display element 30 into which light is incident from a backlight incident surface opposite to an image display surface.

The light collimating member 2 includes: a transparent substrate 21; a plurality of lens 22 that are arranged on one surface of the transparent substrate 21, that is, a lens array; and a plurality of truncated cones 20 that are arranged on another surface of the transparent substrate 21.

As illustrated in FIG. 1, the light source 10 is arranged to face a side surface of the light guide plate 12, and the light collimating member 2 is arranged on a main surface of the light guide plate 12 on a side (the liquid crystal display element 30 side) where light exits. The light collimating member 2 is arranged such that the truncated cone 20 side faces the light guide plate 12.

In this liquid crystal display device 40, light emitted from the light source 10 is incident into the side surface of the light guide plate 12. The light guide plate 12 guides the light incident from the side surface and emits the light from the main surface on the liquid crystal display element 30 side. The light emitted from the light guide plate 12 is incident into the light collimating member 2. The light collimating member 2 condenses (improves directivity) the incident light in a normal direction (front direction) of the main surface on the liquid crystal display element side and emits the condensed light such that the light is incident into the liquid crystal display element 30.

The light source 10 according to the embodiment may be a LED or may be a laser light source. The laser light source is preferable from the viewpoints that color reproducibility can be improved and light can be efficiently spread in an in-plane direction. In addition, as the light source, a white light source may be used, or a plurality of light sources having different emission colors may be used. From the viewpoint of reducing the thickness of the liquid crystal display device, the thickness of the light source is preferably as small as possible, more preferably 0.2 mm to 5 mm, and still more preferably 0.2 mm to 1 mm.

In the example illustrated in FIG. 1, the light source 10 is arranged on and fixed to a substrate 11.

The substrate 11 is arranged on the surface of the light guide plate 12 opposite to the surface where light exits. In addition, the size of the surface of the substrate 11 is the size that covers the surface of the light guide plate 12 opposite to the surface where light exits.

The substrate 11 on which the light source 10 is arranged is not particularly limited, and various well-known substrates can be used. In order to effectively utilize light, it is preferable that the surface of the substrate 11 facing the light guide plate 12 is a reflecting surface having a small absorption and a high reflectivity. For example, it is preferable that a reflecting surface including a multi-layer film that is formed of a white polyethylene terephthalate (PET) or a polyester resin is provided, but the present invention is not limited thereto. Examples of the multi-layer film formed of a polyester resin include ESR (trade name, manufactured by 3M).

It is preferable that a transparent substrate having a small absorption at an emission wavelength of the light source 10 is used as the light guide plate 12. For example, a transparent substrate such as an acrylic substrate represented by polymethyl methacrylate (PMMA), a glass substrate, or a polycarbonate substrate is preferable. In particular, the acrylic substrate is preferable because it has high transparency and high surface smoothness. In addition, the glass substrate is preferable because it has high rigidity such that the thickness of a film can be reduced and it can contribute to a reduction in the size of the liquid crystal display device as a whole. From the viewpoint that light from the light source can be efficiently guided and the viewpoint that light absorption can be suppressed, a refractive index n1 of the light guide plate is preferably 1.4 to 1.6.

An adhesive layer 13 is provided on the light guide plate 12 in order to cause the light collimating member 2 and the light guide plate 12 to optically adhere to each other. As the adhesive layer 13, various well-known materials such as various adhesives, pressure sensitive adhesives, or an ultraviolet (UV) curable resin can be used, and a material having a small absorption at an emission wavelength and high transparency is preferably used. In addition, in a case where a liquid adhesive is used, the liquid adhesive adheres to a side surface of the truncated cone and affects the effect. Therefore, it is preferable that a solid adhesive having a small amount of a liquid component is used.

The modulus of elasticity of the adhesive layer 13 is preferably 0.1 MPa to 3.0 MPa, and the thickness of the adhesive layer 13 is preferably 1 μm to 20 μm. By using a material having properties in the above-described range, deformation of the adhesive layer 13 can be suppressed, and light leak derived from the deformation can be suppressed. In addition, adhesiveness between the truncated cone 20 and the light guide plate 12 can be improved.

The adhesive layer 13 may be provided so as to cover the entire surface of the light guide plate 12 where light exits, or may be provided on only a surface 20a of the truncated cone 20 of the light collimating member 2 opposite to the transparent substrate 21. From the viewpoint of light extraction from the light guide plate 12 and refraction of light incident into the truncated cone 20, it is preferable that a refractive index n3 of the adhesive layer 13 satisfies a relationship of n1≤n3<n2 or n1<n3≤n2.

n1 represents the refractive index of the light guide plate 12, and n2 represents the refractive index of the truncated cone.

Figure 2A:
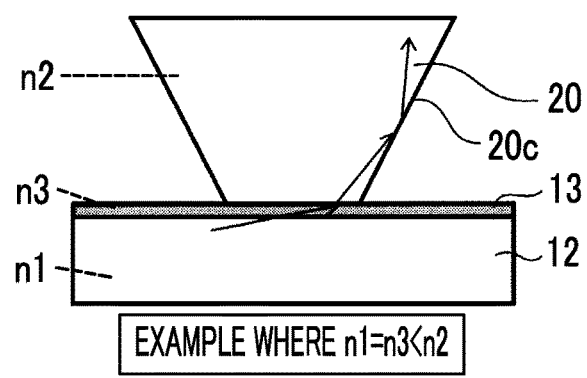
FIG. 2A is a schematic cross-sectional view illustrating light refraction on an interface between a light guide plate and a truncated cone in an example of a backlight unit according to the present invention.
Figure 2B:
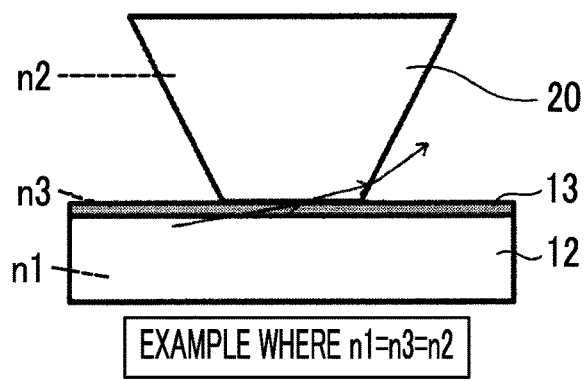
FIG. 2B is a schematic cross-sectional view illustrating light refraction on the interface between the light guide plate and the truncated cone in another example of the backlight unit according to the present invention.

FIG. 2A illustrates a case where n1=n3<n2 as an example of a preferable aspect. The refractive index n2 of the truncated cone 20 included in the light collimating member 2 according to the embodiment has a higher value than the refractive index n1 of the light guide plate. As a result, as illustrated in FIG. 2A, light incident into the surface of the light guide plate 12 at a high angle is refracted on an interface between the light guide plate 12 and the adhesive layer 13 or on an interface between the adhesive layer 13 and the surface 20a of the truncated cone. Therefore, the amount of light fully reflected from a slope 20c of the truncated cone 20 can be increased. Conversely, in a case where the refractive index n2 is lower than or equal to n1, as illustrated in FIG. 2B, the amount of light that leaks from the slope without being fully reflected from the slope 20c of the truncated cone 20 can be increased.

As described above, the light collimating member 2 includes: the transparent substrate 21; the plurality of lens 22 (lens array) that are arranged on one surface of the transparent substrate 21; and the plurality of truncated cones 20 that are arranged on another surface of the transparent substrate 21.

The truncated cone 20 has a shape in which a width (the diameter of a cross-section perpendicular to a height direction) decreases away from the transparent substrate 21 in a height direction (a direction perpendicular to the main surface of the transparent substrate 21). Accordingly, a side surface (hereinafter, referred to as "slope 20c") of the truncated cone 20 is inclined with respect to the height direction.

Here, in a case where one lens 22 and one truncated cone 20 corresponding to the lens 22 are set as one unit, in at least one unit, a position of the lens 22 in an in-plane direction (a direction parallel to the main surface of the transparent substrate 21) deviates from a position in the in-plane direction of the truncated cone 20 corresponding to the lens 22 to move away from the light source 10 in a direction that connects a center of the lens 22 and the light source 10 most adjacent to the lens 22, and an optical axis of the lens 22 is arranged to pass through a slope of the truncated cone 20 corresponding to the lens 22.

In at least one unit, the positions of the lens 22 and the truncated cone 20 may deviate from each other. However, it is preferable that, in all the units, the positions of the lens 22 and the truncated cone 20 deviate from each other.

In addition, the deviation amounts of the lenses 22 and the truncated cones 20 in all the units may be the same as or different from each other.

In addition, the arrangement of the plurality of lenses 22 and the arrangement of the plurality of truncated cones 20 may have the same form and the plurality of lenses 22 may deviate from the plurality of truncated cones 20 as a whole.

In the light collimating member included in the backlight unit according to the present invention, it is preferable that the shape of the truncated cone of the light collimating member satisfies the following Expressions 1 to 3.

$$\frac{n2}{n1} \geq 1.03 \qquad \text{Expression 1}$$

$$\theta ave - 10° \leq \theta \leq \theta ave + 10° \qquad \text{Expression 2}$$

$$0.05 \leq \frac{r}{R} \leq 0.50 \qquad \text{Expression 3}$$

In the expressions, n1 represents a refractive index of the light guide plate, n2 represents a refractive index of the truncated cone, θave represents a value represented by the following Expression 4, m in Expression 4 represents a division number of an incidence angle range of light incident from the light guide plate into the truncated cone, θi represents an i-th incidence angle in a case where the incidence angle range of the light incident from the light guide plate into the truncated cone is divided m times, θ represents an inclination angle of the truncated cone, R represents a radius of the lens on the transparent substrate side, and r represents a radius of the surface of the truncated cone opposite to the transparent substrate.

Figure 3:
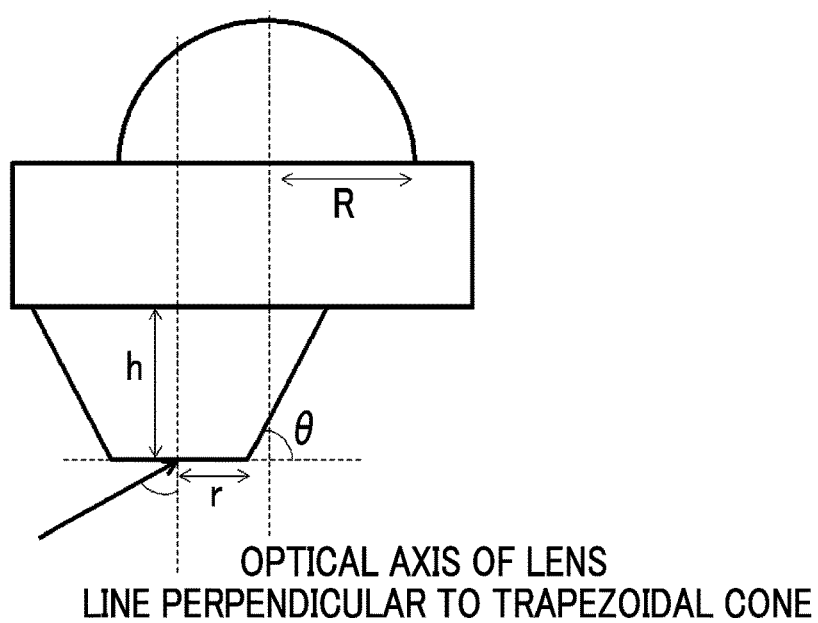
FIG. 3 is a schematic cross-sectional view illustrating shapes of a truncated cone and a lens in a light collimating member included in the backlight unit according to the present invention.

FIG. 3 illustrates portions that define the respective values in the truncated cone.

$$\theta ave = \frac{1}{m} \sum_{i=1}^{m} \left( 90 - \frac{1}{2} \cdot \frac{n1}{n2} \sin^{-1} \theta i \right) \qquad \text{Expression 4}$$

In the present invention, it is more preferable that the shape of the truncated cone satisfies the following Expressions 5 and 6.

$$\theta ave - 5° \leq \theta \leq \theta ave + 5° \qquad \text{Expression 5}$$

$$0.15 \leq \frac{r}{R} \leq 0.42 \qquad \text{Expression 6}$$

By controlling the shape of the truncated cone 20 in the range of Expressions 1 to 3 and Expressions 5 and 6, light leak from the slope 20c of the truncated cone 20 can be suppressed, an increase in brightness in a case where the liquid crystal display device 40 is seen from an oblique direction at the time of black display can be suppressed, and light advancing in the front direction can be condensed and collimated. Further, light extraction efficiency from the light guide plate 12 can be improved, and brightness in the front direction can be increased.

In Expression 4, the incidence angle range (the range of θi) of light incident from the light guide plate into the truncated cone can be obtained as θc to 90° in a case where a critical reflection angle θc of the light guide plate is used. θc is obtained from the following expression.

$$\theta c = \sin^{-1}\left(\frac{n0}{n1}\right)$$

n0: a refractive index of the periphery of the light guide plate (in the case of air, 1.0).

n1: a refractive index of the light guide plate.

Figure 4:
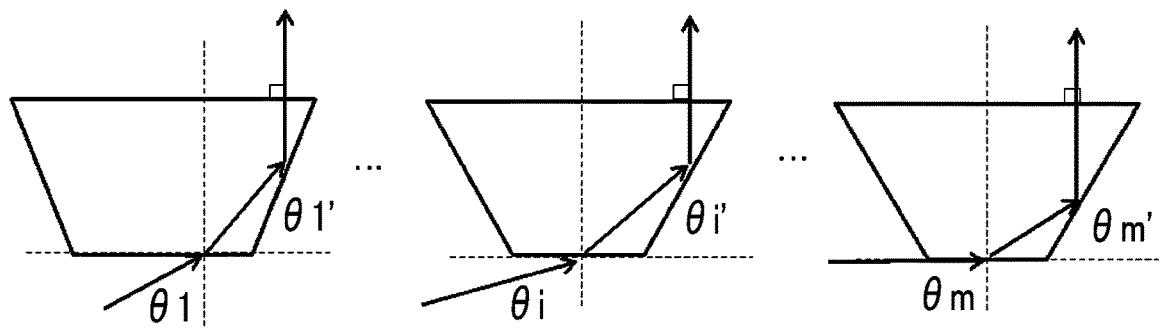
FIG. 4 is a schematic cross-sectional view illustrating θave represented by Expression 4 in the light collimating member.

For example, in a case where the refractive index n1 of the light guide plate disposed in air is 1.5, θc is about 41.8°, and the angle range of light incident from the light guide plate into the truncated cone is 41.8 to 90°.

θave is obtained from Expression 4 by dividing the incidence angle range per 0.1°. As illustrated in FIG. 4, θave represents the average value of inclination angles of the truncated cone required for light incident into the truncated cone at the respective incidence angles to advance in the front direction (0° direction) after being fully reflected from the slope of the truncated cone.

In the backlight unit according to the embodiment of the present invention, it is preferable that a distance L between the optical axis of the lens of the light collimating member and a line perpendicular to the truncated cone satisfies the following Expression 7.

$$r \leq L \leq r + \frac{1}{2} \cdot \frac{h}{\tan \theta} \qquad \text{Expression 7}$$

Figure 5:
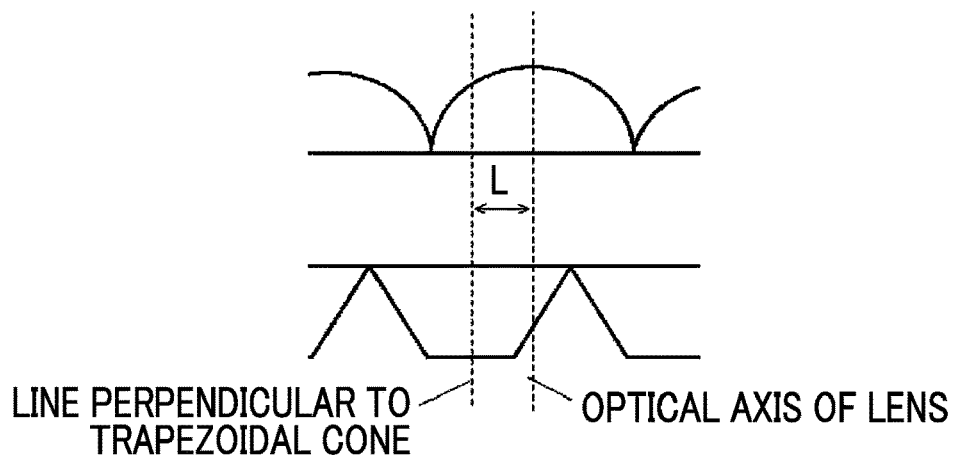
FIG. 5 is a schematic cross-sectional view illustrating a distance L between an optical axis of the lens and a line perpendicular to the truncated cone in the light collimating member.

The definition of L will be described with reference to FIG. 5. In a case where the distance L between the optical axis of the lens and the line perpendicular to the truncated cone satisfies the above-described range, a peak angle of light emitted from the light collimating member can be made to advance in the front direction, and the brightness in the front direction can be increased.

A material for forming the truncated cone 20 of the light collimating member 2 is not particularly limited as long as it is a material having a refractive index higher than the refractive index n1 of the light guide plate. For example, the truncated cone 20 may be formed of a resin having high transparency that is the same as that for forming a light guide plate used in a well-known backlight unit, for example, polyethylene terephthalate, polypropylene, polycarbonate, an acrylic resin such as polymethyl methacrylate, benzyl methacrylate, polymethacrylstyrene (MS resin), a cycloolefin polymer, a cycloolefin copolymer, cellulose diacetate, or cellulose acylate such as cellulose triacetate. The resin is not limited to a thermoplastic resin, and for example, an ultraviolet curable resin such as acrylate monomer or an epoxy monomer, an ionizing radiation-curable resin such as an electron beam-curable resin, or a thermosetting resin can also be used. In addition, in order to increase the refractive index, inorganic particles may be added to the resin material. Examples of the inorganic particles include zirconia particles and titania particles. In order not to scatter light in the resin, it is preferable that the particles having a particle size of several nanometers to several micrometers are dispersed in the resin.

The radius of the truncated cone 20 of the light collimating member 2 on the transparent substrate side is preferably less than one side length of one pixel of the liquid crystal display element and more preferably 1 μm to 200 μm. By adjusting the radius to be in the above-described range, light can be made to be uniformly incident into the pixels.

As the transparent substrate 21 of the light collimating member 2, a substrate formed of a resin having high transparency that is the same as that for forming a light guide plate used in a well-known backlight unit may be used. Examples of the resin include polyethylene terephthalate, polypropylene, polycarbonate, an acrylic resin such as polymethyl methacrylate, benzyl methacrylate, polymethacrylstyrene (MS resin), a cycloolefin polymer, a cycloolefin copolymer, cellulose diacetate, and cellulose acylate such as cellulose triacetate.

It is preferable that a thickness d of the transparent substrate 21 is in a range satisfying the following Expression 8 with respect to a focal length f of the lens.

$$d \leq f \leq d+h,$$  Expression 8

In the expression, h represents a height of the truncated cone.

In addition, the focal length f of the lens is obtained from the following Expression.

$$f = r_1/(n4-1)$$

In the expression, n4 represents a refractive index of the lens, and r1 represents a curvature radius of the lens.

By adjusting the thickness of the transparent substrate 21 to be in the above-described range, light reflected from the slope 20c of the truncated cone 20 can be condensed, and an increase in front brightness and light leak in an oblique direction can be suppressed.

In order to improve adhesiveness between the truncated cone 20 and the lens 22, a surface treatment such as corona treatment or plasma treatment may be performed on the surface of the transparent substrate 21, or an adhesiveness improving layer may be imparted thereto.

The lens 22 forming the lens array of the light collimating member 2 may be a spherical lens or a non-spherical lens, and a curved surface may be adjusted such that light fully reflected from the slope 20c of the truncated cone 20 can be condensed using the lens 22. A material for forming the lens may be a resin having high transparency that is the same as that for forming a light guide plate used in a well-known backlight unit. Examples of the resin include polyethylene terephthalate, polypropylene, polycarbonate, an acrylic resin such as polymethyl methacrylate, benzyl methacrylate, polymethacrylstyrene (MS resin), a cycloolefin polymer, a cycloolefin copolymer, cellulose diacetate, and cellulose acylate such as cellulose triacetate. The resin is not limited to a thermoplastic resin, and for example, an ultraviolet curable resin such as acrylate monomer or an epoxy monomer, an ionizing radiation-curable resin such as an electron beam-curable resin, or a thermosetting resin can also be used.

The radius of the lens 22 of the light collimating member 2 on the transparent substrate side is preferably less than one side length of one pixel of the liquid crystal display element and more preferably 1 µm to 200 µm. By adjusting the radius to be in the above-described range, light can be made to be uniformly incident into the pixels.

Figure 6:
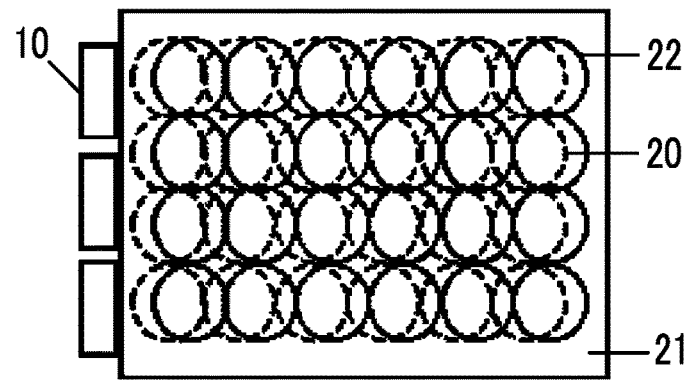
FIG. 6 is a schematic plan view illustrating an example where lenses and truncated cones in the light collimating member are arranged in a square arrangement.
Figure 7:
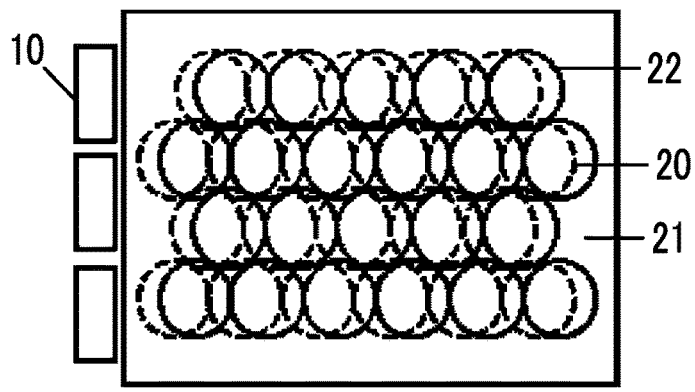
FIG. 7 is a schematic plan view illustrating an example where lenses and truncated cones in the light collimating member are arranged in a hexagonal arrangement.
Figure 8:
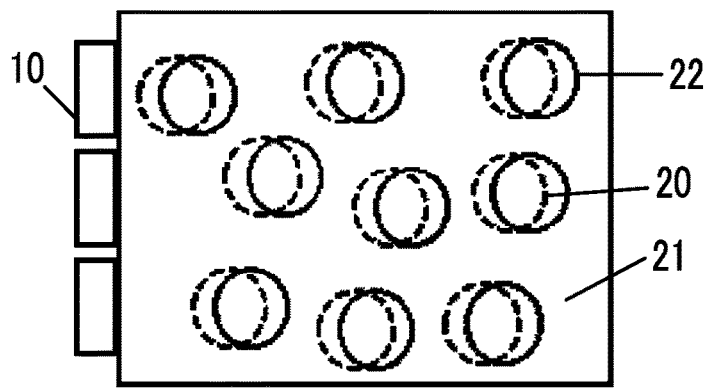
FIG. 8 is a schematic plan view illustrating an example where lenses and truncated cones in the light collimating member are arranged in a random arrangement.

FIGS. 6 to 8 illustrate arrangement examples of the lenses 22 and the truncated cones 20 in case of being seen from a normal direction in which light is emitted from the main surface of the light collimating member 2. The lenses 22 and the truncated cones 20 may be arranged to be close-packed in a square arrangement or a hexagonal arrangement as illustrated in FIGS. 6 and 7, or may be randomly arranged as illustrated in FIG. 8. That is, in a case where one lens 22 and one truncated cone 20 corresponding to the lens 22 are set as one unit, a plurality of units may be randomly arranged. By changing the arrangement density of the units depending on the distance from the light source 10, the arrangement may be adjusted such that light can be uniformly extracted from a plane of the light collimating member 2.

By randomly arranging the units (the lenses 22 and the truncated cones 20), the occurrence of moire can be suppressed.

In the example illustrated in FIG. 1, the truncated cone 20 and the light guide plate 12 adhere to each other through the adhesive layer 13, but the present invention is not limited thereto. The truncated cone 20 and the light guide plate 12 may directly adhere to each other.

Figure 11:
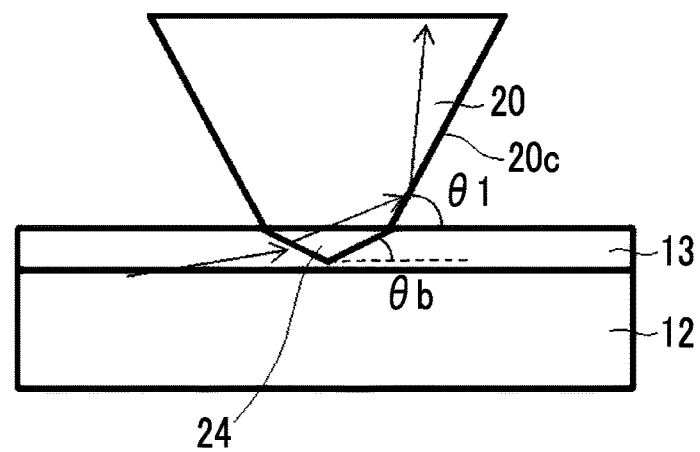
FIG. 11 is an enlarged schematic cross-sectional view illustrating another example of the contact portion between the truncated cone and the light guide plate.

Here, in a case where the truncated cone 20 and the light guide plate 12 adhere to each other through the adhesive layer 13, it is preferable that, as illustrated in FIG. 11, a truncated conical or conical protrusion 24 is provided on the surface (lower surface) of the truncated cone 20 opposite to the transparent substrate 21. An inclination angle of the protrusion 24 is less than that of the truncated cone 20. In addition, the radius of a surface of the protrusion 24 on the truncated cone 20 side is equal to a radius of the surface (surface on the protrusion 24 side) of the truncated cone 20 opposite to the transparent substrate 21.

Figure 10:
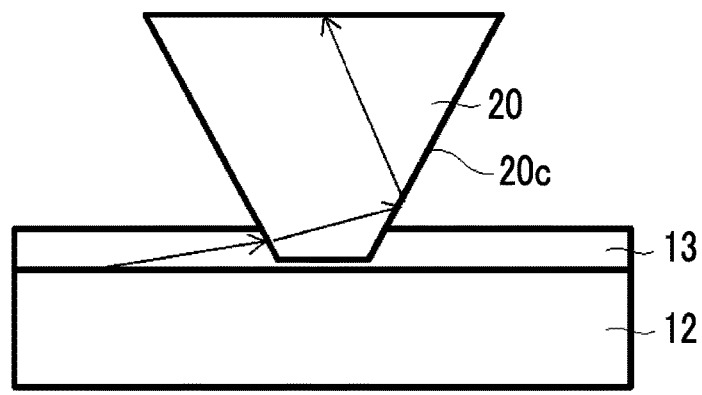
FIG. 10 is an enlarged schematic cross-sectional view illustrating a contact portion between the truncated cone and the light guide plate.

In a configuration in which the protrusion 24 is not provided, as illustrated in FIG. 10, a part of light from the light guide plate 12 passes through the adhesive layer 13 and is incident from the slope 20c of the truncated cone 20 into the truncated cone 20. In a case where this light is reflected from the slope 20c of the truncated cone 20, the light is reflected in a direction oblique to the front direction. Therefore, the amount of light leak in an oblique direction may increase.

On the other hand, as illustrated in FIG. 11, by providing the protrusion 24 having a smaller inclination angle than the truncated cone 20 on the lower surface of the truncated cone 20, light having passed through the adhesive layer 13 is incident from the protrusion 24 into the truncated cone 20. As a result, the light is reflected from the slope 20c of the truncated cone 20 in the front direction, and the amount of light leak in an oblique direction can be reduced. This way, by providing the protrusion 24 on the lower surface of the truncated cone 20, light leak caused when the truncated cone 20 is buried in the adhesive layer 13 can be suppressed, and adhesiveness between the truncated cone 20 and the adhesive layer 13 can be improved.

From the viewpoint that light leak can be suitably suppressed, the inclination angle θb of the protrusion 24 is preferably 5° to 25°.

In addition, in the example illustrated in FIG. 1, the light source 10 is arranged on one side surface of the light guide plate 12, but the present invention is not limited thereto. The light source may be arranged on two or more side surfaces of the light guide plate. In a case where the light source is arranged on two or more side surfaces of the light guide plate, the position of the lens may deviate from the position of the truncated cone to move away from the light source most adjacent to the lens in a direction that connects the lens and the light source most adjacent to the lens. In addition, in a case where the lens is positioned at the same distance from the plurality of light sources, the position of the lens may deviate from the position of the truncated cone with respect to at least one light source.

In addition, a light absorbing layer having an opening may also be provided between the truncated cone 20 and the lens 22 in the light collimating member 2. It is preferable that a center of the opening matches the position of the optical axis of the lens 22.

Figure 12:
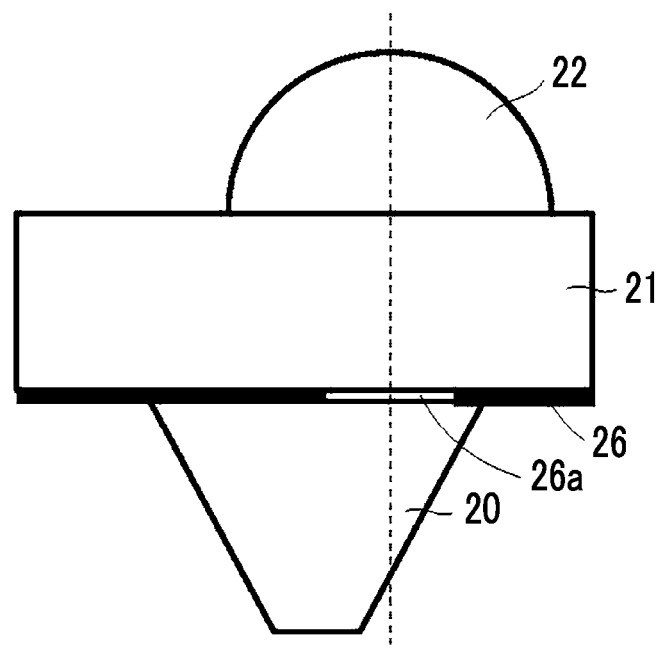
FIG. 12 is a schematic cross-sectional view illustrating another example of the light collimating member.

For example, in an example of the light collimating member illustrated in FIG. 12, a light absorbing layer 26 is provided between the truncated cone 20 and the transparent substrate 21. In the light absorbing layer 26, an opening 26a is provided, and a center of the opening matches the optical axis of the lens 22.

Figure 13:
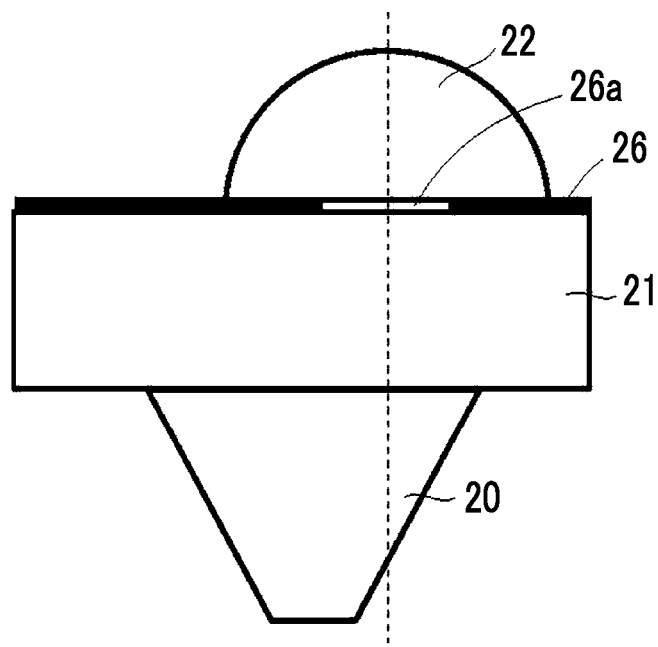
FIG. 13 is a schematic cross-sectional view illustrating still another example of the light collimating member.

Alternatively, in an example of the light collimating member illustrated in FIG. 13, a light absorbing layer 26 is provided between the lens 22 and the transparent substrate 21. Even in this case, in the light absorbing layer 26, the opening 26a is provided, and the center of the opening matches the optical axis of the lens 22.

This way, by providing the light absorbing layer having the opening between the truncated cone and the lens, among light components reflected from the slope of the truncated cone, a light component advancing in the front direction passes through the opening, is incident into the lens, and a light component advancing in an oblique direction is absorbed by the light absorbing layer 26. Therefore, oblique light leak can be suppressed.

Here, the shape of the opening of the light absorbing layer is not particularly limited and is preferably circular.

In a case where the opening is circular, it is preferable that a diameter Rb of the opening satisfies Expression 9.

$$0.15 < Rb/R \leq 1.0 \quad \text{Expression 9}$$

By adjusting Rb/R to be 0.15 or higher, the amount of light incident into the lens can be secured, and high front brightness can be obtained in a case where the backlight unit is used in a liquid crystal display device. By adjusting Rb/R to be 1 or lower, a light shielding effect can be reliably obtained, and oblique light leak can be suitably suppressed.

From the viewpoint that oblique light leak can be suitably suppressed, an absorbance of the light absorbing layer is preferably 1 or higher.

As the light absorbing layer, a material obtained by mixing carbon black or carbon nanotube with an existing binder material can be used. In addition, by using a resist material as the binder material, the opening of the absorbing layer can be patterned and formed by ultraviolet (UV) exposure.

The thickness of the light absorbing layer may be appropriately set depending on the material, absorbance, light transmittance, and the like of the light absorbing layer. Specifically, the thickness of the light absorbing layer is preferably 0.1 μm to 10 μm and more preferably 0.5 μm to 5 μm.

In the backlight unit according to the embodiment of the present invention, for example, a louver film or a light absorbing sheet having anisotropy (hereinafter, referred to as "anisotropic light absorbing sheet") may be provided on the light collimating member. By providing the anisotropic light absorbing sheet, the amount of light that leaks in an oblique direction can be further reduced. As the anisotropic light absorbing sheet, for example, a louver type optical sheet (black security/privacy filter, manufactured by 3M) or an optical film described in JP4902516B in which a dichroic colorant is anisotropically aligned can be used.

Light Deflection Member

Figure 14:
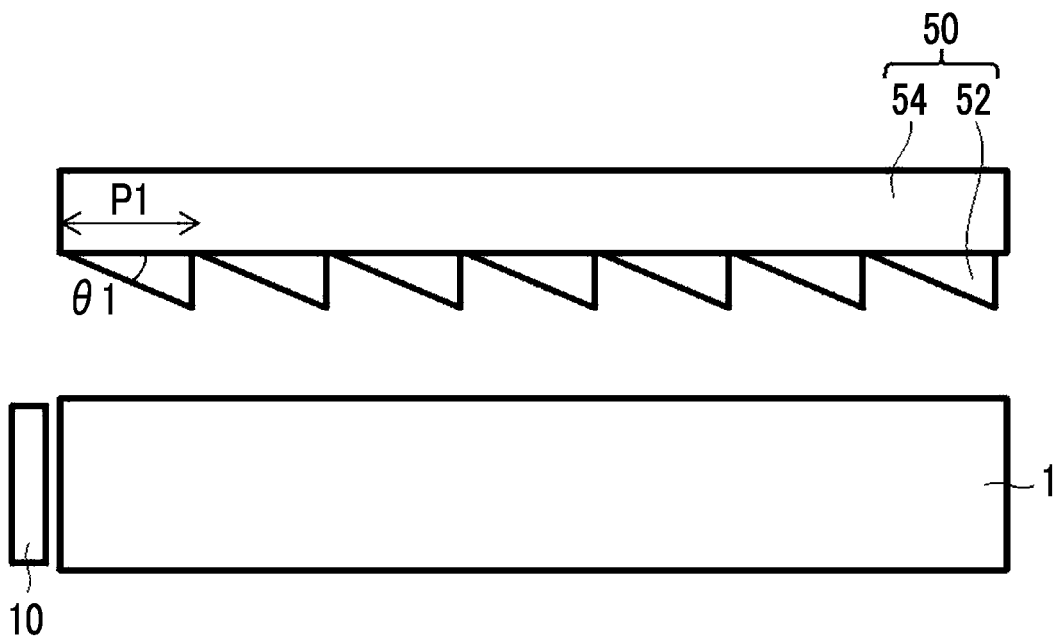
FIG. 14 is a schematic cross-sectional view illustrating a configuration of a backlight unit according to Example.

In the backlight unit according to the embodiment of the present invention, a light deflection member may be provided on the light collimating member in order to control a light emission direction (refer to FIG. 14). Examples of the light deflection member include a prism sheet using light refraction, a lens sheet, and a light transmitting diffraction grating using diffraction. As a member that deflects parallel light emitted from the light collimating member in one direction, a prism sheet is preferable.

As described above, in the backlight unit according to the embodiment of the present invention, light having small light leak in an oblique direction and having a high brightness in the front direction can be emitted. In the backlight unit according to the embodiment of the present invention, by further providing the light deflection member, light emitted in the front direction can be deflected in any direction such that brightness in any direction can be improved.

By using the backlight unit, for example, a display mounted on an automobile can be easily seen from a specific direction (for example, a driver's seat side) and can be made to be inconspicuous from other directions. As a result, reflection of the display the front surface of the automobile or a side window glass can be suppressed, and thus a driver can easily see the outside through the front surface and the side window glass.

Diffusion Film

In addition, in order to control spreading of light emitted from the light deflection member, a diffusion film may be provided on the light deflection member. As the diffusion film, a well-known diffusion film can be used. In particular, in order to maintain a light emission direction, it is preferable to use a diffusion film in which and on which backward scattering is reduced, for example, a diffusion sheet having unevenness on a surface thereof.

In a liquid crystal display device including the light collimating member according to the present invention, it is preferable that a light diffusion member is provided on a visible side of a liquid crystal panel. As the light diffusion member, a well-known member, for example, a diffusion sheet including particles in a substrate, a diffusion sheet including unevenness on a surface thereof, a diffraction grating, or a member using light refraction such as a microlens array or a lenticular lens can be used.

By providing the light diffusion member, parallel light having passed through the liquid crystal panel can be diffused, and viewing angle dependence of the liquid crystal display device can be improved.

Figure 25:
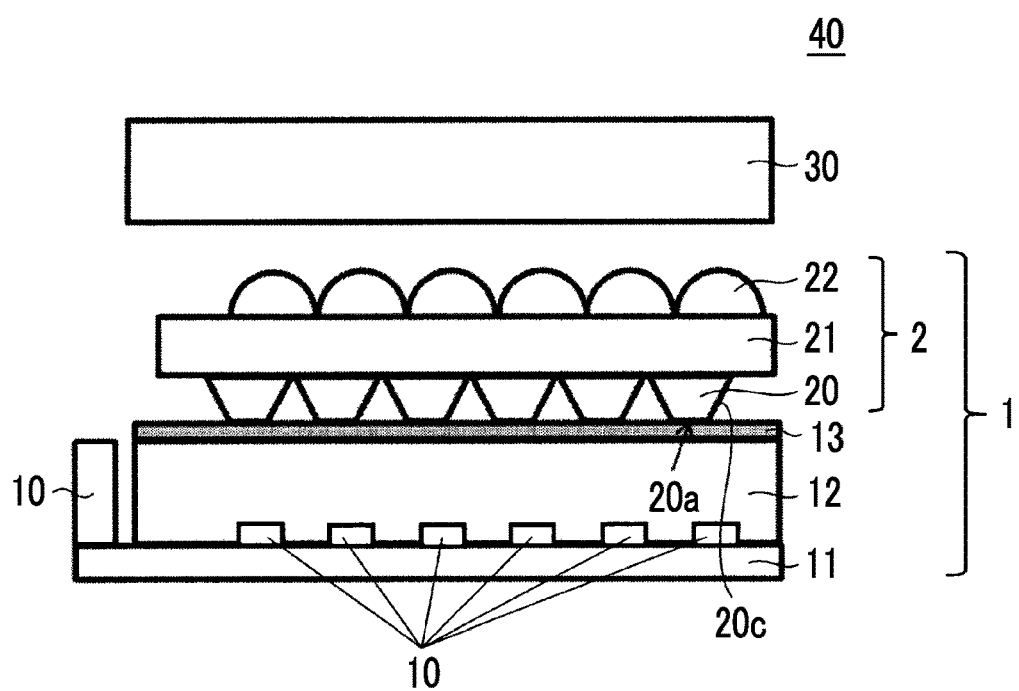
FIG. 25 is a schematic cross-sectional view illustrating another example of the liquid crystal display device according to the present invention.

In addition, in the backlight unit according to the embodiment of the present invention, as illustrated in FIG. 25, a side edge mode light source and a direct backlight mode light source may be used in combination. When the side edge mode light source is lighted (the direct backlight mode light source is not lighted), light having small light leak in an oblique direction and having a high brightness in the front direction can be emitted. On the other hand, when the direct backlight mode light source is lighted (the side edge mode light source is not lighted), light is refracted by the respective members in various directions. Therefore, backlight is emitted not only in the front direction but also an oblique direction. That is, with one display, the viewing angle can switch between a narrow visual field and a wide visual field simply by switching between the light sources to be lighted. As a result, privacy can be emphasized during use for one person, and data or an image/a video can be shared during use for a plurality of persons.

EXAMPLES

Hereinafter, the characteristics of the present invention will be described in detail using examples. Materials, used amounts, ratios, treatment details, treatment procedures, and the like shown below can be appropriately changed within a range not departing from the scope of the present invention.

In addition, configurations other than those shown below can be adopted within a range not departing from the scope of the present invention.

Example 1

Preparation of Light Collimating Member

A mold I and a mold II were prepared, the mold I having a structure in which truncated cones having an inclination angle θ of 62°, a radius of 30 μm on a transparent substrate side, a height h of 42 μm, and a pitch of 60 μm were arranged in a square arrangement, and the mold II having a structure in which spherical lenses having a radius R of 30 μm and a pitch of 60 μm were arranged in a square arrangement.

A PET film (COSMOSHINE A4300, manufactured by Toyobo Co., Ltd.) having a thickness of 50 μm was used as the transparent substrate, an ultraviolet curable resin (ACHR-MOLD-19, manufactured by Aica Kogyo Co., Ltd.) having n2=1.69 was applied to one surface of the transparent substrate, the mold I was pressed, and then the resin was irradiated with ultraviolet light and cured. The cured resin was released from the mold I, and a pattern of truncated cones was formed on the PET film.

An ultraviolet curable resin (Z=977-9L, manufactured by Aica Kogyo Co., Ltd.) having n=1.50 was applied to a surface of the transparent substrate opposite to the truncated cones were formed, the mold II was pressed, and then the resin was irradiated with ultraviolet light and cured. The cured resin was released from the mold II, and a pattern of lenses was formed on the PET film. The lenses and the truncated cones were made to deviate from each other such that the distance between an optical axis of the lens and a line perpendicular to the truncated cone was 13.3 μm. As a result, a light collimating member A1 was obtained.

Bonding Between Light Guide Plate and Light Collimating Member

As a light guide plate, an acrylic plate (CRALEX, manufactured by Nitto Jushi Kogyo Co., Ltd.) having a thickness of 1.0 mm and a refractive index n1 of 1.50 was used. Next, in order to prepare a material for forming an optical adhesive layer, 90.87 parts by mass of SK DINE SF-2147 (manufactured by Soken Chemical & Engineering Co., Ltd.), 0.04 parts by mass of TD-75 (manufactured by Soken Chemical & Engineering Co., Ltd.), and 9.09 parts by mass of ethyl acetate were mixed with each other. This solution was applied to the light guide plate such that the thickness after drying was 0.3 to 0.5 μm and was heated at 70° C. for 10 minutes. As a result, an optical adhesive layer having a refractive index of 1.50 was formed.

The truncated cones of the light collimating member were bonded to adhere to the light guide plate on which the optical adhesive layer was provided.

Example 2

A light guide plate including a light collimating member A2 was prepared using the same method as that of Example 1, except that the mold I in which truncated cones having an inclination angle θ of 57° were arranged was used and the distance L between the optical axis of the lens and the line perpendicular to the truncated cone was 9.5 μm.

Example 3

A light guide plate including a light collimating member A3 was prepared using the same method as that of Example 1, except that the mold I in which truncated cones having an inclination angle θ of 70° were arranged was used and the distance L between the optical axis of the lens and the line perpendicular to the truncated cone was 18.5 μm.

Example 4

A light guide plate including a light collimating member A4 was prepared using the same method as that of Example 1, except that a resin having n2=1.60 obtained by mixing the ultraviolet curable resin having n2=1.69 and the ultraviolet curable resin having n=1.50 described in Example 1 with each other was used as the resin for forming the truncated cones.

Example 5

A light guide plate including a light collimating member A5 was prepared using the same method as that of Example 1, except that a resin having n2=1.75 (a resin for imprinting, manufactured by NTT Advanced Technology Corporation) was used instead of the resin for forming the truncated cones, the inclination angle θ of the truncated cone was changed to 65°, and the distance L between the optical axis of the lens and the line perpendicular to the truncated cone was changed to 15.3 μm.

Example 6

A light guide plate including a light collimating member A6 was prepared using the same method as that of Example 1, except that the distance L between the optical axis of the lens and the line perpendicular to the truncated cone was 5.4 μm.

Example 7

A light guide plate including a light collimating member A7 was prepared using the same method as that of Example 1, except that the distance L between the optical axis of the lens and the line perpendicular to the truncated cone was 20.6 μm.

Comparative Example 1

Aspect Where Truncated Cones and Member Including Lenses Were Not Provided

A mold having a prism shape was prepared. A mold having a shape in which a prism apex angle was 45°, a prism pitch was 50 μm, and a prism shape extended in one direction was prepared.

An ultraviolet curable resin (Z=977-9L, manufactured by Aica Kogyo Co., Ltd.) having n=1.50 was applied to one surface of A PET film (COSMOSHINE A4300, manufactured by Toyobo Co., Ltd.) having a thickness of 100 μm, the mold having a prism shape was pressed, and then the resin was irradiated with ultraviolet light and cured. The cured resin was released from the mold, and a prism shape was formed on the PET film. As a result, a prism sheet B1 was prepared.

Next, a VA mode liquid crystal display device LL-M220 (manufactured by Sharp Corporation) was disassembled to extract a light guide plate with white dots and a diffusion film. The diffusion film was provided on the light guide plate, and two prism sheets B1 were further provided such that extending directions of the prisms were perpendicular to each other.

Comparative Example 2

A light guide plate including a light collimating member B2 was prepared using the same method as that of Example 1, except that the mold I in which truncated cones having an inclination angle θ of 75° were arranged was used and the distance L between the optical axis of the lens and the line perpendicular to the truncated cone was 20.8 μm.

Comparative Example 3

A light guide plate including a light collimating member B3 was prepared using the same method as that of Example 1, except that an ultraviolet curable resin (Z-977-9L, manufactured by Aica Kogyo Co., Ltd.) having n2=1.50 was used as the resin for forming the truncated cones.

Comparative Example 4

A mold I and a mold II were prepared, the mold I having a structure in which truncated cones having an inclination angle θ of 57°, a radius of 24 μm on a transparent substrate side, a height h of 30 μm, and a pitch of 100 μm were arranged in a square arrangement, and the mold II having a structure in which spherical lenses having a curvature radius R of 52 μm and a pitch of 100 μm were arranged in a square arrangement.

An ultraviolet curable resin composition having n=1.47 (a mixture of 80 parts by weight of KAYARAD-HX220 (manufactured by Nippon Kayaku Co., Ltd.), 20 parts by weight of KAYARAD-UX4101 (manufactured by Nippon Kayaku Co., Ltd.), 1 part by weight of IRGACURE 184 (manufactured by BASF Japan Ltd.), 0.2 parts by weight of KAYA-CURE-EPA (manufactured by Nippon Kayaku Co., Ltd.), and 1.5 parts by weight of TINUVIN PS (manufactured by BASF Japan Ltd)) was applied to one surface of a PET film (COSMOSHINE A4300, manufactured by Toyobo Co., Ltd.) having a thickness of 38 μm, the mold I was pressed, and then the resin was irradiated with ultraviolet light and cured. The cured resin was released from the mold I, and a pattern of truncated cones was formed on the PET film.

An ultraviolet curable resin (Z=977-9L, manufactured by Aica Kogyo Co., Ltd.) having n=1.50 was applied to a surface of the transparent substrate opposite to the truncated cones were formed, the mold II was pressed, and then the resin was irradiated with ultraviolet light and cured. The cured resin was released from the mold II, and a pattern of lenses was formed on the PET film. The lenses and the truncated cones were formed such that an optical axis of the lens and a line perpendicular to the truncated cone matched each other. As a result, a light collimating member B4 was obtained.

Comparative Example 5

Aspect Where Truncated Cones and Member Including Lenses Were Not Provided

A lens sheet described in Example 1 of JP2009-162843A including a first non-spherical lens array and a second concave prism array was prepared. First, a mold of the first non-spherical lens array and a mold of the second concave prism array were prepared. An ultraviolet curable resin (Z=977-9L, manufactured by Aica Kogyo Co., Ltd.) having n=1.50 was applied to one surface of A PET film (COSMOSHINE A4300, manufactured by Toyobo Co., Ltd.) having a thickness of 75 μm, the mold of the first non-spherical lens array was pressed, and then the resin was irradiated with ultraviolet light and cured. The cured resin was released from the mold, and a pattern of non-spherical lenses was formed on the PET film. An ultraviolet curable resin (ACHR-MOLD-19, manufactured by Aica Kogyo Co., Ltd.) having n=1.69 was applied to one surface of the transparent substrate, the mold of the second concave prism was pressed, and then the resin was irradiated with ultraviolet light and cured. The cured resin was released from the mold. As a result, a desired lens sheet was obtained. The first non-spherical lens array and the second concave prism array were formed such that an optical axis of the first non-spherical lens and an apex of the second concave prism matched each other.

Evaluation

Refractive Index

The refractive index of each of the materials at a wavelength of 532 nm was measured using a prism coupler model 2010 (manufactured by Metricon Corporation).

Evaluation of Backlight Unit

Next, a VA mode liquid crystal display device LL-M220 (manufactured by Sharp Corporation) was disassembled to extract a light guide plate. Next, a light guide plate edge surface of the member prepared in each of Examples and Comparative Examples was arranged to adhere to a LED. Each of the light collimating members was arranged such that the optical axis of the lens deviated from the line perpendicular to the truncated cone by the distance L shown in Table 1 (Table 1-1) in a direction (light advancing direction from the LED) perpendicular to the light guide plate edge surface adhering to the LED.

Figure 9:
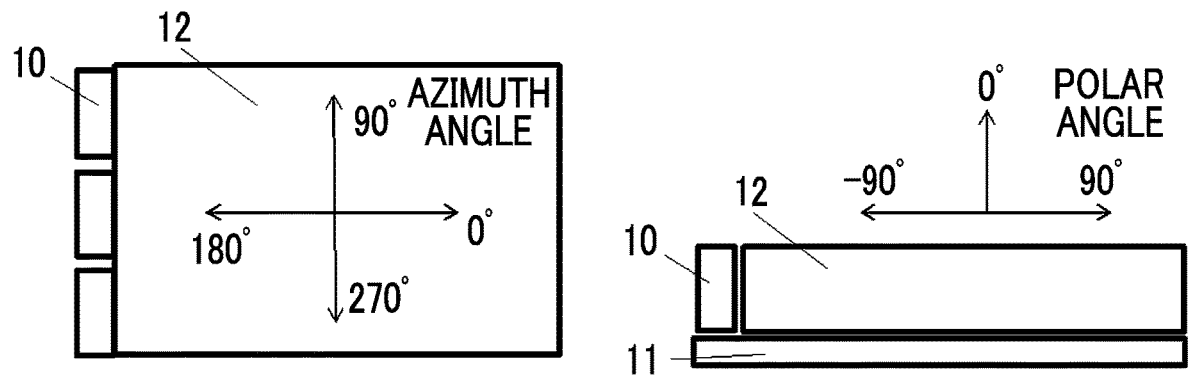
FIG. 9 is a schematic diagram illustrating the definition of an azimuthal angle in the evaluation of the backlight unit and the liquid crystal display device.

The light source of the prepared backlight unit was lighted, and a brightness distribution was measured using EZContrast (manufactured by ELDIM Co.). A brightness value in a polar angle 0° direction (front direction), a brightness value at an azimuthal angle of 0° and a polar angle of 60°, a brightness value at an azimuthal angle of 180° and a polar angle of −60°, and a half width at half maximum of a brightness peak in the front direction were set as indices. FIG. 9 illustrates the definitions of the azimuthal angle and the polar angle.

Evaluation of Liquid Crystal Display Device Including Backlight Unit

A liquid crystal cell of LL-M220 was arranged on the prepared backlight unit. In a case where the backlight unit according to any one of Examples 1 to 7 and Comparative Examples 2 to 5 was used, a lenticular lens (60 Lpi, thickness: 0.43 mm) was arranged on the visible side outermost surface of the liquid crystal panel. The lenticular lens was arranged such that an extending direction of the lens was an azimuthal angle 90° direction. In a case where the backlight unit was lighted such that the liquid crystal cell was in a white display state or a black display state, the brightness was measured using EZContrast (manufactured by ELDIM Co.). A brightness value in a polar angle 0° direction (front direction), a brightness value at an azimuthal angle of 0° and a polar angle of 60°, and a brightness value at an azimuthal angle of 180° and a polar angle of −60° in the white display state and the black display state were set as indices.

The measurement results of Examples and Comparative Examples are shown in Table 1 (Tables 1-1 and 1-2). It can be seen that, in Comparative Example 1 in which two prism sheets of a backlight of the related art were used, the brightness at a polar angle of ±60° was high at about 800 Cd/m², the half width at half maximum of the brightness peak in the front direction was 33°, and light was not collimated. Likewise, it can be seen that, in Comparative Example 5 having the configuration described JP2009-162843A, the brightness at a polar angle of ±60° was high at about 800 Cd/m², the half width at half maximum of the brightness peak in the front direction was 36°, and light was not collimated.

In addition, in Comparative Example 1 in which the inclination angle of the truncated cone was high and in Comparative Example 2 in which the refractive indices of the truncated cone and the light guide plate were the same, the half width at half maximum of the brightness peak in the front direction was 10° or less, and light was not collimated. However, the brightness at a polar angle of ±60° was high at about 900 to 3000 Cd/m². In Comparative Example 4 according to the embodiment of JP1998-253808A (JP-H10-253808A), the brightness peak in the front direction was −7°, and the brightness in a direction inclined from the front direction and the brightness in the front direction were low.

On the other hand, it can be seen that, in Examples 1 to 7 according to the present invention, the half width at half maximum of the brightness peak in the front direction was 10° or less, the peak angle was within a range of 0°±5°, and the brightness at a polar angle of ±60° was able to be suppressed. In particular, it can be seen that, in Examples 1, 4, and 5 satisfying Expressions 4 and 5, the brightness at a polar angle of ±60° was further suppressed as compared to other Examples, and the brightness in the front direction was improved.

TABLE 1-1

| | Light Guide Plate Refractive Index n1 [—] | Refractive Index n2 [—] | Shape of Trapezoidal Cone θ [°] | Radius of Transparent Substrate Side [μm] | r [μm] | h [μm] | n2/n1 [—] | θave [°] | Pitch [μm] | Lens R [μm] | Pitch [μm] | 1 − h/R · tanθ [—] | Distance between Line Perpendicular to Trapezoidal Cone and Optical Axis of Lens L [μm] | r [μm] | r + h/2 · tanθ [μm] |
|---|---|---|---|---|---|---|---|---|---|---|---|---|---|---|---|
| Example 1 | 1.50 | 1.69 | 62 | 30 | 8 | 42 | 1.13 | 64 | 60 | 30 | 60 | 0.26 | 13.3 | 7.7 | 18.8 |
| Example 2 | 1.50 | 1.69 | 57 | 30 | 3 | 42 | 1.13 | 64 | 60 | 30 | 60 | 0.09 | 9.5 | 2.7 | 16.4 |
| Example 3 | 1.50 | 1.69 | 70 | 30 | 15 | 42 | 1.13 | 64 | 60 | 30 | 60 | 0.49 | 18.5 | 14.7 | 22.4 |
| Example 4 | 1.50 | 1.60 | 62 | 30 | 8 | 42 | 1.07 | 61 | 60 | 30 | 60 | 0.26 | 13.3 | 7.7 | 18.8 |
| Example 5 | 1.50 | 1.75 | 65 | 30 | 10 | 42 | 1.17 | 65 | 60 | 30 | 60 | 0.35 | 15.3 | 10.4 | 20.2 |
| Example 6 | 1.50 | 1.69 | 62 | 30 | 8 | 42 | 1.13 | 64 | 60 | 30 | 60 | 0.26 | 5.4 | 7.7 | 18.8 |
| Example 7 | 1.50 | 1.69 | 62 | 30 | 8 | 42 | 1.13 | 64 | 60 | 30 | 60 | 0.26 | 20.6 | 7.7 | 18.8 |
| Comparative Example 1 | — | — | — | — | — | — | — | — | — | — | — | — | — | — | — |
| Comparative Example 2 | 1.50 | 1.69 | 75 | 30 | 19 | 42 | 1.13 | 64 | 60 | 30 | 60 | 0.62 | 20.8 | 18.7 | 24.4 |
| Comparative Example 3 | 1.50 | 1.50 | 57 | 30 | 11 | 30 | 1.00 | 57 | 60 | 30 | 60 | 0.35 | 15.4 | 10.5 | 20.3 |
| Comparative Example 4 | 1.50 | 1.47 | 57 | 24 | 5.0 | 30 | 0.98 | 64 | 100 | 52 | 100 | 0.10 | 0.0 | 5.0 | 14.7 |
| Comparative Example 5 | — | — | — | — | — | — | — | — | — | — | — | — | — | — | — |

TABLE 1-2

| | Brightness, Peak Angle, and Half Width at Half Maximum of Backlight | | | | |
|---|---|---|---|---|---|
| | Front Brightness [Cd/m²] | Brightness at Polar Angle of 60° [Cd/m²] | Brightness at Polar Angle of −60° [Cd/m²] | Angle of Brightness Peak in Front Direction [°] | Half Width at Half Maximum of Brightness Peak in Front Direction [°] |
| Example 1 | 20600 | 71 | 62 | 1 | 5 |
| Example 2 | 10291 | 160 | 282 | 0 | 3 |
| Example 3 | 9203 | 728 | 960 | 0 | 8 |
| Example 4 | 13179 | 226 | 112 | 2 | 5 |
| Example 5 | 19203 | 110 | 56 | 0 | 6 |
| Example 6 | 11000 | 174 | 239 | −5 | 5 |

TABLE 1-2-continued

Brightness, Peak Angle, and Half Width at Half Maximum of Backlight

| | Front Brightness [Cd/m²] | Brightness at Polar Angle of 60° [Cd/m²] | Brightness at Polar Angle of −60° [Cd/m²] | Angle of Brightness Peak in Front Direction [°] | Half Width at Half Maximum of Brightness Peak in Front Direction [°] |
|---|---|---|---|---|---|
| Example 7 | 8047 | 121 | 39 | 5 | 6 |
| Comparative Example 1 | 5962 | 810 | 779 | 0 | 33 |
| Comparative Example 2 | 3701 | 2296 | 3082 | 2 | 10 |
| Comparative Example 3 | 14614 | 1178 | 213 | 2 | 5 |
| Comparative Example 4 | 5514 | 254 | 60 | −7 | 5 |
| Comparative Example 5 | 5642 | 885 | 769 | 0 | 36 |

Next, Table 2 shows the evaluation results of the liquid crystal display device including the backlight unit according to each of Examples and Comparative Examples. As in the brightness evaluation results of the backlight unit, in Examples according to the present invention, the brightness at a polar angle of ±60° at the time of black display was further suppressed as compared to Comparative Examples, and the brightness in the front direction at a polar angle of ±60° at the time of white display was increased, and display performance with high contrast was able to be achieved.

Next, the result of arranging an anisotropic light absorbing sheet on the light collimating member according to the present invention will be shown.

Example 8

A louver film (Black Privacy Filter, PF12.1WS, manufactured by 3M) was further provided on the light collimating member according to Example 1.

TABLE 2

| | Brightness at time of White Display | | | Brightness at time of Black Display | | |
|---|---|---|---|---|---|---|
| Backlight Unit Used | Front Direction [Cd/m²] | Polar Angle of 60° [Cd/m²] | Polar Angle of −60° [Cd/m²] | Front Direction [Cd/m²] | Polar Angle of 60° [Cd/m²] | Polar Angle of −60° [Cd/m²] |
| Example 1 | 343 | 60 | 52 | 0.011 | 0.001 | 0.001 |
| Example 2 | 158 | 54 | 53 | 0.004 | 0.001 | 0.003 |
| Example 3 | 165 | 64 | 70 | 0.010 | 0.015 | 0.020 |
| Example 4 | 219 | 66 | 55 | 0.007 | 0.003 | 0.001 |
| Example 5 | 336 | 55 | 47 | 0.012 | 0.001 | 0.001 |
| Example 6 | 192 | 58 | 54 | 0.007 | 0.002 | 0.003 |
| Example 7 | 141 | 55 | 46 | 0.005 | 0.001 | 0.000 |
| Comparative Example 1 | 250 | 38 | 37 | 0.038 | 0.177 | 0.174 |
| Comparative Example 2 | 69 | 117 | 147 | 0.006 | 0.063 | 0.085 |
| Comparative Example 3 | 243 | 106 | 59 | 0.008 | 0.016 | 0.003 |
| Comparative Example 4 | 92 | 67 | 52 | 0.003 | 0.003 | 0.001 |
| Comparative Example 5 | 235 | 37 | 32 | 0.059 | 0.246 | 0.213 |

Example 9

Preparation of Anisotropic Light Absorbing Composition

The following components were mixed with each other and were stirred at 80° C. for 1 hour to obtain an anisotropic light absorbing composition. As a dichroic colorant, an azo colorant described in Examples of JP2013-101328A was used. Polymerizable liquid crystal compounds 1 and 2 were synthesized using a method described in lub et al., Recl. Tray. Chim. Pays-Bas, 115, 321-328 (1996).

Anisotropic Light Absorbing Composition

| | |
|---|---:|
| The following polymerizable liquid crystal compound 1 | 75 parts by mass |
| The following polymerizable liquid crystal compound 2 | 25 parts by mass |
| Dichroic colorant 1 | 2.8 parts by mass |
| Polymerization initiator (2-dimethylamino-2-benzyl-1-(4-morpholinophenyl)butan-1-one (IRGACURE 369; manufactured by Ciba Specialty Chemicals)) | 6 parts by mass |
| Leveling agent (polyacrylate compound (BYK-361N; manufactured by BYK Chemie) | 3 parts by mass |
| Solvent (o-xylene) | 250 parts by mass |

Polymerizable Liquid Crystal Compound 1

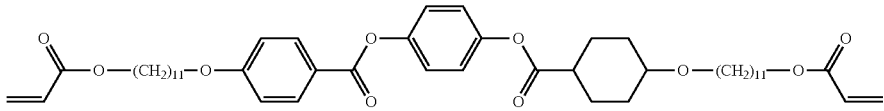

Polymerizable Liquid Crystal Compound 2

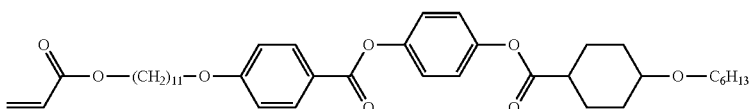

Dichroic Colorant 1

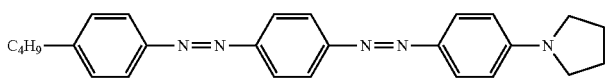

Preparation of Anisotropic Light Absorbing Sheet 1

The above-described anisotropic light absorbing composition was applied to a PET (COSMOSHINE A4300, manufactured by Toyobo Co., Ltd.) having a long side length of 490 mm, a short side length of 280 mm, and a thickness of 50 μm using a spin coater and was dried for 1 minute using a drying oven set to 110° C. As a result, a dry coating film in which the polymerizable liquid crystal compound and the dichroic colorant were aligned was obtained. This dry coating film was naturally cooled to room temperature and was irradiated with ultraviolet light (in a nitrogen atmosphere, wavelength: 365 nm, cumulative light amount: 1000 mJ/cm$^2$ at a wavelength of 365 nm) using a high pressure mercury lamp (UNICURE VB-15201BY-A, manufactured by Ushio Inc.). As a result, the polymerizable liquid crystal compound was polymerized, and an anisotropic light absorbing sheet 1 was obtained.

In Example 9, the anisotropic light absorbing sheet 1 was provided on the light collimating member according to Example 1.

Table 3 shows the evaluation results of the liquid crystal display device including the backlight unit according to each of Examples in which the louver film or the anisotropic light absorbing sheet 1 was arranged. In Examples 8 and 9 in which the louver film or the anisotropic light absorbing sheet was arranged, it can be seen that the brightness in an oblique direction at the time of black display was further reduced while suppressing a decrease in brightness at the time of white display as compared to Example 1.

TABLE 3

| | Backlight Configuration | | Brightness at time of White Display | | | Brightness at time of Black Display | | |
|---|---|---|---|---|---|---|---|---|
| | Light Collimating Member | Anisotropic Light Absorbing Sheet | Front Direction [Cd/m$^2$] | Polar Angle of 60° [Cd/m$^2$] | Polar Angle of −60° [Cd/m$^2$] | Front Direction [Cd/m$^2$] | Polar Angle of 60° [Cd/m$^2$] | Polar Angle of −60° [Cd/m$^2$] |
| Example 1 | Example 1 | None | 343 | 60 | 52 | 0.011 | 0.001 | 0.001 |
| Example 8 | Example 1 | Louver Film | 0 | 0 | 0 | 0.000 | <0.001 | <0.001 |
| Example 9 | Example 1 | Anisotropic Light Absorbing Sheet 1 | 310 | 55 | 48 | 0.009 | <0.001 | <0.001 |

Example 10

Lenses and truncated cones having the same shape as that of Example 1 were formed on a PET having a long side length of 490 mm, a short side length of 280 mm, and a thickness of 50 μm. A backlight unit was prepared using the same method as that of Example 1, except that structures each of which included one set of the lens and the truncated cone were randomly arranged such that the density of the structures increased from 70 pieces/mm$^2$ to 278 pieces/mm$^2$ in a direction from one short side to another short side.

Next, Table 4 shows the observation results of moire of the liquid crystal display device including the backlight unit according to Examples 1 and 10. It can be seen that, in Example 10 in which the structures were randomly arranged, the occurrence of moire was suppressed, and visibility was excellent.

TABLE 4

| | Arrangement | Moire |
|---|---|---|
| Example 1 | Uniform Arrangement | Observed |
| Example 10 | Random Arrangement in which Distribution Density increased in Direction from Azimuth Angle of 180° to 0° | Not Observed |

Examples 11 to 17 and Comparative Examples 6 to 10

Light guide plates including light collimating members, respectively, were prepared using the same methods as those of Examples 1 to 7 and Comparative Examples 1 to 5, except that the following light guide plate was used instead of the light guide plate and the following adhesive layer was used instead of the optical adhesive layer.

Bonding Between Light Guide Plate and Light Collimating Member

As a light guide plate, an acrylic plate (CRALEX, manufactured by Nitto Jushi Kogyo Co., Ltd.) having a size of 280 mm×487 mm and a thickness of 2.0 mm and a refractive index n1 of 1.50 was used. OCA PDS 1-5 (manufactured by PANC Corporation) having a thickness of 5 μm was used as the optical adhesive layer, and the truncated cone of the light collimating member was bonded to the light guide plate. The sample size of the light collimating member was 50 mm$^2$, and the light collimating member was bonded to a center portion of the light guide plate.

Example 18

A light guide plate including a light collimating member A8 was prepared using the same method as that of Example 11, except that the thickness of the PET support (transparent substrate) on which the truncated cones and the lenses were formed was 38 μm.

Example 19

A light guide plate including a light collimating member A9 was prepared using the same method as that of Example 11, except that the thickness of the PET support on which the truncated cones and the lenses were formed was 75 μm.

Example 20

Formation of Light Absorbing Layer

Preparation of Black Pigment Dispersion

Carbon black, a dispersant, a polymer, and a solvent were mixed with each other to obtain the following composition. As a result, a black pigment dispersion 1 was obtained.

Black Pigment Dispersion 1

| | |
|---|---|
| Resin-coated carbon black prepared as described in paragraphs "0036" to "0042" of JP5320652B | 13.1 mass % |
| Dispersant 1 [the following structure] | 0.65 mass % |
| Polymer (a random copolymer including benzyl methacrylate and methacrylic acid at a molar ratio of 72/28; weight-average molecular weight: 37000) | 6.72 mass % |
| Propylene glycol monomethyl ether acetate | 79.53 mass % |

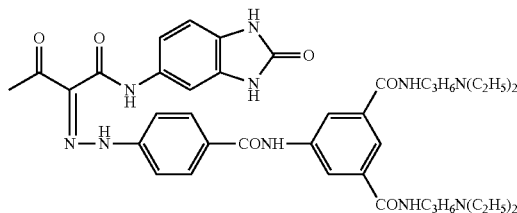

Dispersant 1

Preparation of Light Absorbing Layer-Forming Solution

The black pigment dispersion 1, a binder, a photoacid generator, and a surfactant were mixed with each other to obtain the following composition. As a result, a light absorbing layer-forming solution was prepared. A binder 1 and a binder 2 were synthesized according to WO2013/161861A. The photoacid generator was synthesized WO2014/161861A.

| | |
|---|---|
| Black pigment dispersion 1 | 25.954 mass % |
| Binder 1: a random copolymer having the following structure and a molecular weight of 13700 | 6.836 mass % |
| Binder 2: a random copolymer having the following structure and a molecular weight of 11500 | 6.836 mass % |
| Photoacid generator: a compound having the following structure | 1.000 mass % |
| Surfactant: MEGAFACE F-554, manufactured by DIC Corporation | 0.016 mass % |
| Propylene glycol monomethyl ether acetate | 59.358 mass % |

Binder 1

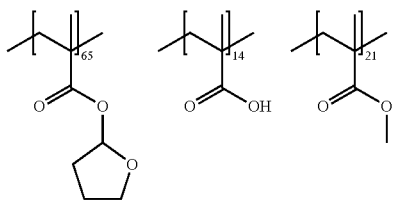

Binder 2

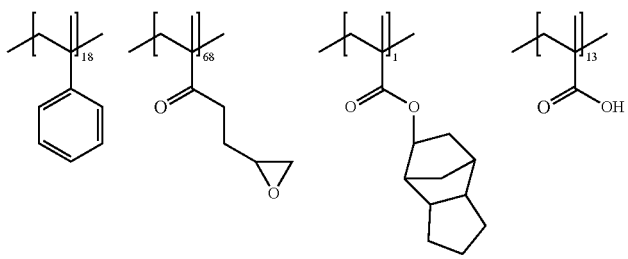

Photoacid Generator

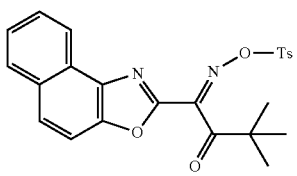 [SMILES: Cc1ccc(S(=O)(=O)O/N=C(\C(=O)C(C)(C)C)c2nc3c(ccc4ccccc43)o2)cc1]

In the expression, Ts represents a tosyl group (p-toluenesulfonyl group).

Preparation of Developer

A KOH developer (KOH, including a nonionic surfactant, trade name: CDK-1, manufactured by Fujifilm Electronic Materials Co., Ltd.) was diluted 100 times and used as a developer.

Patterning of Light Absorbing Layer

Using the mold II of Example 11, a sample in which the lenses were formed on one surface of the PET support was prepared. The light absorbing layer-forming solution prepared as described above was applied to a surface of the PET support opposite to the surface where the lenses were formed, and was dried at 95° C. for 2 minutes. As a result, a light absorbing layer having a thickness of 2 μm was provided. An exposure mask having a circular opening with a diameter of ϕ60 μm at the same pitch (60 μm) as that of the lenses was prepared, and the alignment of the exposure mask was performed d such that the center of the lens matched the center of the opening of the exposure mask. The light absorbing layer was irradiated with parallel UV light such that the irradiation dose at 365 nm was 1000 mJ/cm². After the UV irradiation, puddle development (60 seconds×3 times) was performed using the developer, and the light absorbing layer was cleaned with pure water and was dried with air. Further, the light absorbing layer was irradiated with UV light such that the irradiation dose at 365 nm was 1000 mJ/cm², and a heat treatment was performed at 120° C. for 10 minutes to cure the light absorbing layer. As a result, a lens-formed film C1 in which the light absorbing layer having the opening with a diameter of ϕ60 μm was patterned was obtained.

Formation of Truncated Cone

Using the same method as that of Example 11, truncated cones were formed on the surface on which the black layer of C1 was patterned such that the center of the truncated cone deviated from the lens by 13.3 μm. As a result, a light guide plate including a light collimating member A10 was prepared.

Examples 21 to 23

Light guide plates including light collimating members A11 to A13, respectively were prepared using the same method as that of Example 20, except that the diameter ϕ of the opening of the light absorbing layer was changed as shown in Table 5 (Table 5-1).

Example 24

Using the mold I of Example 11, a sample in which the truncated cones were formed on one surface of the PET support was prepared. The light absorbing layer-forming solution prepared as described above was applied to a surface of the PET support opposite to the surface where the truncated cones were formed, and was dried at 95° C. for 2 minutes. As a result, a light absorbing layer having a thickness of 2 µm was provided. An exposure mask having a circular opening with a diameter of ϕ30 µm at the same pitch (60 µm) as that of the truncated cones was prepared, and the alignment of the exposure mask was performed d such that the center of the opening of the exposure mask deviated from the center of truncated cone by 13.3 µm. The light absorbing layer was irradiated with parallel UV light such that the irradiation dose at 365 nm was 1000 mJ/cm². After the UV irradiation, puddle development (60 seconds×3 times) was performed using the developer, and the light absorbing layer was cleaned with pure water and was dried with air. Further, the light absorbing layer was irradiated with UV light such that the irradiation dose at 365 nm was 1000 mJ/cm², and a heat treatment was performed at 120° C. for 10 minutes to cure the light absorbing layer. As a result, a lens-formed film C2 in which the light absorbing layer having the opening with a diameter of ϕ30 µm was patterned was obtained.

Formation of Lens

Using the same method as that of Example 11, lenses were formed on the surface on which the light absorbing layer of C2 was patterned such that the center of the opening of the light absorbing layer matched the optical axis of the lens. As a result, a light guide plate including a light collimating member A14 was prepared.

Example 25

In order to form the truncated cone including the protrusion as illustrated in FIG. 11, a mold III in which cones having a height of 2 µm were formed on bottom surfaces (opposite to the surface having a radius of 30 µm) of the truncated cones of the mold I was prepared. A light guide plate including a light collimating member A15 was prepared using the same method as that of Example 11, except that the truncated cones were formed using the mold III.

Evaluation

Evaluation of Backlight Unit

Next, a VA mode liquid crystal display device LL-M220 (manufactured by Sharp Corporation) was disassembled to extract a light guide plate. Next, a light guide plate edge surface of the member prepared in each of Examples 11 to 25 and Comparative Examples 6 to 10 was arranged to adhere to a LED. Each of the light collimating members was arranged such that the optical axis of the lens deviated from the line perpendicular to the truncated cone by the distance L shown in Table 5 in a direction (light advancing direction from the LED) perpendicular to the light guide plate edge surface adhering to the LED.

The light source of the prepared backlight unit was lighted, and a brightness distribution was measured using EZContrast (manufactured by ELDIM Co.). The following four points were set as evaluation indices.
  Polar angle of peak brightness
  Half width at half maximum of peak brightness
  Polar angle 0° brightness (front brightness)
  Ratio of brightness (oblique brightness) at an azimuthal angle of 0° and a polar angle of 40° to 60° and at an azimuthal angle of 180° and a polar angle of 40° to 60° to front brightness The definitions of the azimuthal angle and the polar angle are illustrated in FIG. 9.

Evaluation of Liquid Crystal Display Device Including Backlight Unit

A liquid crystal cell of LL-M220 was arranged on the prepared backlight unit. In a case where the backlight unit according to any one of Examples 11 to 25 and Comparative Examples 7 to 10 was used, a lenticular lens (60 Lpi, thickness: 0.43 mm) was arranged on the visible side outermost surface of the liquid crystal panel. The lenticular lens was arranged such that an extending direction of the lens was an azimuthal angle 90° direction. In a case where the backlight unit was lighted such that the liquid crystal cell was in a white display state or a black display state, the brightness was measured using EZContrast (manufactured by ELDIM Co.). The evaluation was performed using the following two points as indices.
  Front brightness at the time of white display
  Contrast (CR) in the front direction and in a direction of an azimuthal angle 0° and a polar angle of 60°

The measurement results of Examples and Comparative Examples are shown in Table 5 (Tables 5-1 and 5-2) and Tables 6 and 7.

It can be seen from Table 5 that, in Comparative Example 6 in which two prism sheets of a backlight of the related art were used, the brightness at a polar angle of 40° to 60° was 0.1 times the front brightness and high, the half width at half maximum of the brightness peak in the front direction was 33°, and it can be seen that light was not collimated. Likewise, it can be seen that, in Comparative Example 10 having the configuration described JP2009-162843A, the brightness at a polar angle of 40° to 60° was 0.14 times the front brightness and high, the half width at half maximum of the brightness peak in the front direction was 36°, and light was not collimated.

In addition, in Comparative Example 6 in which the inclination angle of the truncated cone was high and in Comparative Example 7 in which the refractive indices of the truncated cone and the light guide plate were the same, the half width at half maximum of the brightness peak in the front direction was 10° or less, and light was not collimated. However, the brightness at a polar angle of 40° to 60° was 0.12 times to 0.35 times the front brightness and high. In Comparative Example 9 according to the embodiment of JP1998-253808A (JP-H10-253808A), the brightness peak in the front direction was −5°, and the brightness in a direction inclined from the front direction and the brightness in the front direction were low.

On the other hand, it can be seen that, in Examples 11 to 17 according to the present invention, the half width at half maximum of the brightness peak in the front direction was 10° or less, the peak angle was within a range of 0°±5°, and the brightness at a polar angle of 40° to 60° was able to be suppressed. In particular, it can be seen that, in Examples 11, 14, and 15 satisfying Expressions 4 and 5, the brightness at a polar angle of 40° to 60° was further suppressed as compared to other Examples, and the brightness in the front direction was improved.

In addition, in Examples 11 and 18 satisfying Expression 8, the front brightness was high, and the brightness at a polar angle of 40° to 60° was low. On the other hand, in Example 19 not satisfying Expression 8, a decrease in front brightness, an increase in the half width at half maximum of the peak brightness, and an increase in the brightness at a polar angle of 40° to 60° were shown.

It can be seen from Table 6 that, in Examples 20 to 24 in which the light absorbing layer was provided between the lens and the cone, a brightness suppressing effect at a polar angle of 40° to 60° was shown. In Examples 20 to 22 and 24 satisfying Expression 9, a decrease in the front brightness was within 5% as compared to Example 11. In Example 23 not satisfying Expression 9, the front brightness decreased by about 30%.

It can be seen from Table 7 that, in Example 25 in which the cones were formed on the lower surfaces of the truncated cones, the front brightness decreased by about 30%, but the brightness at a polar angle of 40° to 60° was suppressed.

TABLE 5-1

| | Light Guide Plate Refractive Index n1 [—] | Shape of Trapezoidal Cone | | | | | | Lens | |
|---|---|---|---|---|---|---|---|---|---|
| | | Refractive Index n2 [—] | θ [°] | Radius of Transparent Substrate Side [μm] | r [μm] | h [μm] | n2/n1 [—] | θ ave [°] | R [μm] | Pitch [μm] |
| Example 11 | 1.50 | 1.69 | 62 | 30 | 8 | 42 | 1.13 | 64 | 60 | 30 | 60 |
| Example 12 | 1.50 | 1.69 | 57 | 30 | 3 | 42 | 1.13 | 64 | 60 | 30 | 60 |
| Example 13 | 1.50 | 1.69 | 70 | 30 | 15 | 42 | 1.13 | 64 | 60 | 30 | 60 |
| Example 14 | 1.50 | 1.60 | 62 | 30 | 8 | 42 | 1.07 | 61 | 60 | 30 | 60 |
| Example 15 | 1.50 | 1.75 | 65 | 30 | 10 | 42 | 1.17 | 65 | 60 | 30 | 60 |
| Example 16 | 1.50 | 1.69 | 62 | 30 | 8 | 42 | 1.13 | 64 | 60 | 30 | 60 |
| Example 17 | 1.50 | 1.69 | 62 | 30 | 8 | 42 | 1.13 | 64 | 60 | 30 | 60 |
| Example 18 | 1.50 | 1.69 | 62 | 30 | 8 | 42 | 1.13 | 64 | 60 | 30 | 60 |
| Example 19 | 1.50 | 1.69 | 62 | 30 | 8 | 42 | 1.13 | 64 | 60 | 30 | 60 |
| Comparative Example 6 | — | — | — | — | — | — | — | — | — | — | — |
| Comparative Example 7 | 1.50 | 1.69 | 75 | 30 | 19 | 42 | 1.13 | 64 | 60 | 30 | 60 |
| Comparative Example 8 | 1.50 | 1.50 | 57 | 30 | 11 | 30 | 1.00 | 57 | 60 | 30 | 60 |
| Comparative Example 9 | 1.50 | 1.47 | 57 | 24 | 5.0 | 30 | 0.98 | 64 | 100 | 52 | 100 |
| Comparative Example 10 | — | — | — | — | — | — | — | — | — | — | — |

| | Lens | | Distance between Line Perpendicular to Trapezoidal Cone and Optical Axis of Lens | | | Transparent Substrate | |
|---|---|---|---|---|---|---|---|
| | Focal Length f of Lens [μm] | 1 − h/R · tanθ [—] | L [μm] | r [μm] | r + h/2 · tanθ [μm] | d [μm] | d + h [μm] |
| Example 11 | 60 | 0.26 | 13.3 | 7.7 | 18.8 | 50 | 92 |
| Example 12 | 60 | 0.09 | 9.5 | 2.7 | 16.4 | 50 | 92 |
| Example 13 | 60 | 0.49 | 18.5 | 14.7 | 22.4 | 50 | 92 |
| Example 14 | 60 | 0.26 | 13.3 | 7.7 | 18.8 | 50 | 92 |
| Example 15 | 60 | 0.35 | 15.3 | 10.4 | 20.2 | 50 | 92 |
| Example 16 | 60 | 0.26 | 5.4 | 7.7 | 18.8 | 50 | 92 |
| Example 17 | 60 | 0.26 | 20.6 | 7.7 | 18.8 | 50 | 92 |
| Example 18 | 60 | 0.26 | 13.3 | 7.7 | 18.8 | 38 | 80 |
| Example 19 | 60 | 0.26 | 13.3 | 7.7 | 18.8 | 75 | 117 |
| Comparative Example 6 | — | — | — | — | — | 100 | |
| Comparative Example 7 | 60 | 0.62 | 20.8 | 18.7 | 24.4 | 50 | 92 |
| Comparative Example 8 | 60 | 0.35 | 15.4 | 10.5 | 20.3 | 50 | 80 |
| Comparative Example 9 | 103 | 0.10 | 0.0 | 5.0 | 14.7 | 38 | 68 |
| Comparative Example 10 | — | — | — | — | — | 75 | — |

TABLE 5-2

|  | Evaluation | | | |
| --- | --- | --- | --- | --- |
|  | Angle of Brightness Peak in Front Direction [°] | Half Width at Half Maximum of Brightness Peak in Front Direction [°] | Front Brightness [Cd/m²] | Brightness Ratio Average Brightness Value at ±40° to 60°/Front Brightness [—] |
| Example 11 | 0 | 5 | 52325 | 0.036 |
| Example 12 | 0 | 5 | 11222 | 0.042 |
| Example 13 | 0 | 7 | 80727 | 0.054 |
| Example 14 | 0 | 7 | 54145 | 0.028 |
| Example 15 | −1 | 6 | 75677 | 0.032 |
| Example 16 | −5 | 6 | 23502 | 0.047 |
| Example 17 | 5 | 6 | 35208 | 0.032 |
| Example 18 | 0 | 5 | 70698 | 0.022 |
| Example 19 | 0 | 7 | 26021 | 0.041 |
| Comparative Example 6 | 0 | 33 | 5962 | 0.100 |
| Comparative Example 7 | −1 | 7 | 39417 | 0.346 |
| Comparative Example 8 | 0 | 11 | 26271 | 0.116 |
| Comparative Example 9 | −5 | 5 | 5705 | 0.021 |
| Comparative Example 10 | 0 | 36 | 5642 | 0.140 |

TABLE 6

|  | Light Absorbing Layer | | Evaluation | | | |
| --- | --- | --- | --- | --- | --- | --- |
|  | Diameter φ of Opening [μm] | Position [—] | Angle of Brightness Peak in Front Direction [°] | Half Width at Half Maximum of Brightness Peak in Front Direction [°] | Front Brightness [Cd/m²] | Brightness Ratio Average Brightness Value at ±40° to 60°/Front Brightness [—] |
| Example 11 | None | None | 0 | 5 | 52325 | 0.036 |
| Example 20 | 60 | Trapezoidal Cone Side | 0 | 5 | 52605 | 0.031 |
| Example 21 | 30 | Trapezoidal Cone Side | 0 | 5 | 52112 | 0.005 |
| Example 22 | 15 | Trapezoidal Cone Side | 0 | 5 | 50709 | 0.000 |
| Example 23 | 5 | Trapezoidal Cone Side | 0 | 2 | 38030 | 0.000 |
| Example 24 | 30 | Lens Side | 0 | 5 | 50568 | 0.005 |

TABLE 7

|  |  | Evaluation | | | |
| --- | --- | --- | --- | --- | --- |
|  | Protrusion | Angle of Brightness Peak in Front Direction [°] | Half Width at Half Maximum of Brightness Peak in Front Direction [°] | Front Brightness [Cd/m²] | Brightness Ratio Average Brightness Value at ±40° to 60°/Front Brightness [—] |
| Example 11 | Not Provided | 0 | 5 | 52325 | 0.036 |
| Example 25 | Provided | 0 | 5 | 34718 | 0.019 |

Next, Table 8 shows the evaluation results of the liquid crystal display device including the backlight unit according to each of Examples and Comparative Examples. As in the brightness evaluation results of the backlight unit, it can be seen that, in Examples according to the present invention, the contrast in the front direction and at a polar angle of 60° was further improved as compared to Comparative Examples.

TABLE 8

| Backlight Unit Used | Front Brightness at time of White Display [Cd/m$^2$] | Front CR [—] | CR at Polar Angle of 60° [—] |
|---|---|---|---|
| Example 11 | 901 | 33800 | 3500 |
| Example 12 | 193 | 24100 | 2300 |
| Example 13 | 1458 | 21500 | 2140 |
| Example 14 | 978 | 19000 | 2330 |
| Example 15 | 1335 | 26100 | 3060 |
| Example 16 | 415 | 9300 | 920 |
| Example 17 | 621 | 11200 | 1020 |
| Example 18 | 1217 | 34500 | 3730 |
| Example 19 | 470 | 12400 | 1940 |
| Example 21 | 628 | 33500 | 4670 |
| Example 25 | 598 | 33300 | 4083 |
| Comparative Example 6 | 250 | 6600 | 220 |
| Comparative Example 7 | 712 | 19340 | 2330 |
| Comparative Example 8 | 519 | 9800 | 330 |
| Comparative Example 9 | 98 | 33300 | 3570 |
| Comparative Example 10 | 235 | 6000 | 150 |

Next, the result of arranging an anisotropic light absorbing sheet on the light collimating member according to the present invention will be shown.

Examples 26 and 27

A louver film (Black Privacy Filter, PF12.1WS, manufactured by 3M) and the anisotropic light absorbing sheet 1 prepared in Example 9 were further provided on the light collimating member according to Example 11, and the evaluation was performed.

Table 9 shows the evaluation results of the liquid crystal display device including the backlight unit according to each of Examples 26 and 27. In Examples 26 and 27 in which the anisotropic light absorbing sheet was arranged, It can be seen that the brightness in an oblique direction at the time of black display was further reduced while suppressing a decrease in brightness at the time of white display as compared to Example 11.

TABLE 9

| | Backlight Configuration | | Brightness at time of White Display | | CR at Polar Angle of 60° [—] |
|---|---|---|---|---|---|
| | Light Collimating Member | Anisotropic Light Absorbing Sheet | Front Direction [Cd/m$^2$] | Front CR [—] | |
| Example 1 | Example 1 | None | 901 | 33800 | 3500 |
| Example 26 | Example 1 | Louver Film | 772 | 33000 | 4900 |

TABLE 9-continued

| | Backlight Configuration | | Brightness at time of White Display | | CR at Polar Angle of 60° [—] |
|---|---|---|---|---|---|
| | Light Collimating Member | Anisotropic Light Absorbing Sheet | Front Direction [Cd/m$^2$] | Front CR [—] | |
| Example 27 | Example 1 | Anisotropic Light Absorbing Sheet 1 | 815 | 33500 | 4950 |

Example 28

Lenses and truncated cones having the same shape as that of Example 11 were formed on a PET having a long side length of 490 mm, a short side length of 280 mm, and a thickness of 50 μm. A backlight unit was prepared using the same method as that of Example 11, except that structures each of which included one set of the lens and the truncated cone were randomly arranged such that the density of the structures increased from 70 pieces/mm$^2$ to 278 pieces/mm$^2$ in a direction from one short side to another short side.

Next, Table 10 shows the observation results of moire of the liquid crystal display device including the backlight unit according to Examples 11 and 28. It can be seen that, in Example 28 in which the structures were randomly arranged, the occurrence of moire was suppressed, and visibility was excellent.

TABLE 10

| | Arrangement | Moire |
|---|---|---|
| Example 1 | Uniform Arrangement | Observed |
| Example 28 | Random Arrangement in which Distribution Density increased in Direction from Azimuth Angle of 180° to 0° | Not Observed |

Next, an example in which a light deflection member was arranged on the light collimating member of the backlight unit according to the embodiment of the present invention such that a light emission direction was bent from the front to another direction will be described.

Example 29

As illustrated in FIG. 14, a prism sheet 50 was arranged on the backlight unit 1 according to Example 11, the prism sheet 50 having a structure in which prisms 52 were formed on one surface of a PET support 54 having a thickness of 100 μm at a prism angle θ1=40 and a prism pitch P1=30 μm. The prism sheet was arranged such that the prism side was the light collimating member side.

Example 30

Figure 15:
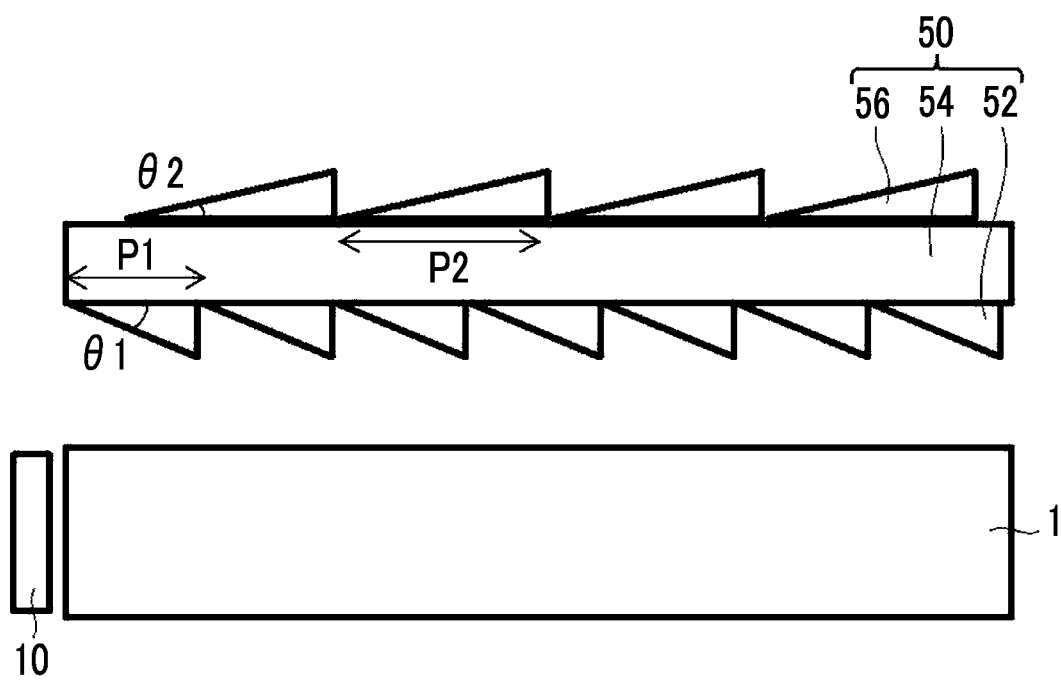
FIG. 15 is a schematic cross-sectional view illustrating the configuration of the backlight unit according to Example.

As illustrated in FIG. 15, the prism sheet 50 was arranged on the backlight unit 1 according to Example 11, the prism sheet 50 having a structure in which the prisms 52 were formed on one surface of the PET support 54 having a thickness of 100 μm at a prism angle θ1=40 and a prism pitch P1=30 μm and prisms 56 were formed on another surface of the PET support 54 having a thickness of 100 μm at a prism angle θ2=21 and a prism pitch P2=60 μm. The prism sheet 50 was arranged such that the surface where the prisms 52 having a prism angle of 40° were formed was the light collimating member side.

Comparative Example 11

Light Guide Plate

A light guide plate was prepared, in which a shape (arrangement pitch P1=100 μm, angle α=2°, angle β=15°) described in Examples of JP2015-130361A was formed on a rear surface side, and a pentagonal shape described in Example 4 of JP2013-051149A was formed on an emission side. The thickness of the light guide plate was 2 mm.

Prism Sheet

Figure 16:
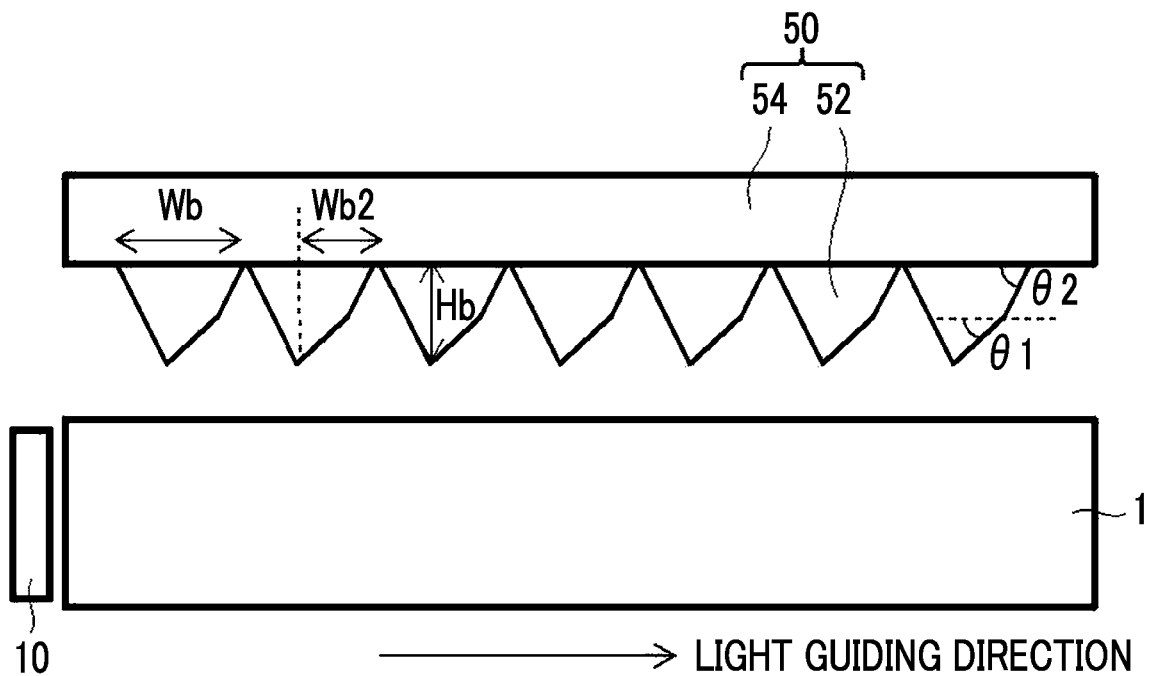
FIG. 16 is a schematic cross-sectional view illustrating a configuration of a backlight unit according to Comparative Example.
Figure 17:
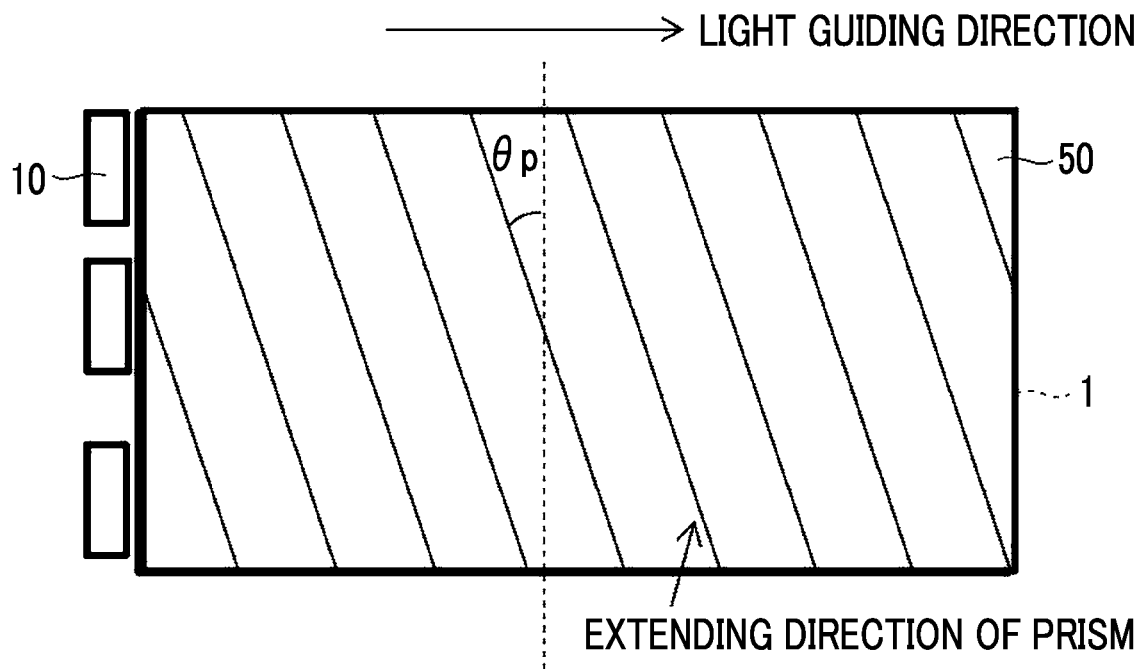
FIG. 17 is a schematic diagram illustrating an arrangement angle of a prism sheet.

A prism sheet was prepared with reference to JP2017-037829A. The respective dimensions of the prism portion are Wb=18 μm, Hb=14 μm, Wb2=11 μm, θ1=51.0°, and θ2=53.5 (refer to FIG. 16).

This prism sheet was arranged such that the prism portion faces the light guide plate.

Comparative Example 12

A prism sheet was prepared using the same method as that of Comparative Example 11, except that the respective dimensions of the prism portion are Wb=18 μm, Hb=14 μm, Wb2=6 μm, θ1=65.0°, and θ2=67.5. This prism sheet was arranged on the same light guide plate as that of Comparative Example 11.

An angle between an extending direction of the prism portion of the prism sheet and an azimuthal angle 90° was θp.

In a case where θp was changed from 0° to 180°, a brightness distribution was measured, and a polar angle, an azimuthal angle, and a brightness value of the peak brightness at each θp were obtained.

In each of the examples, a ratio of the peak brightness at each θp to the peak brightness when θp=0° was set as a brightness ratio L.

Figure 18:
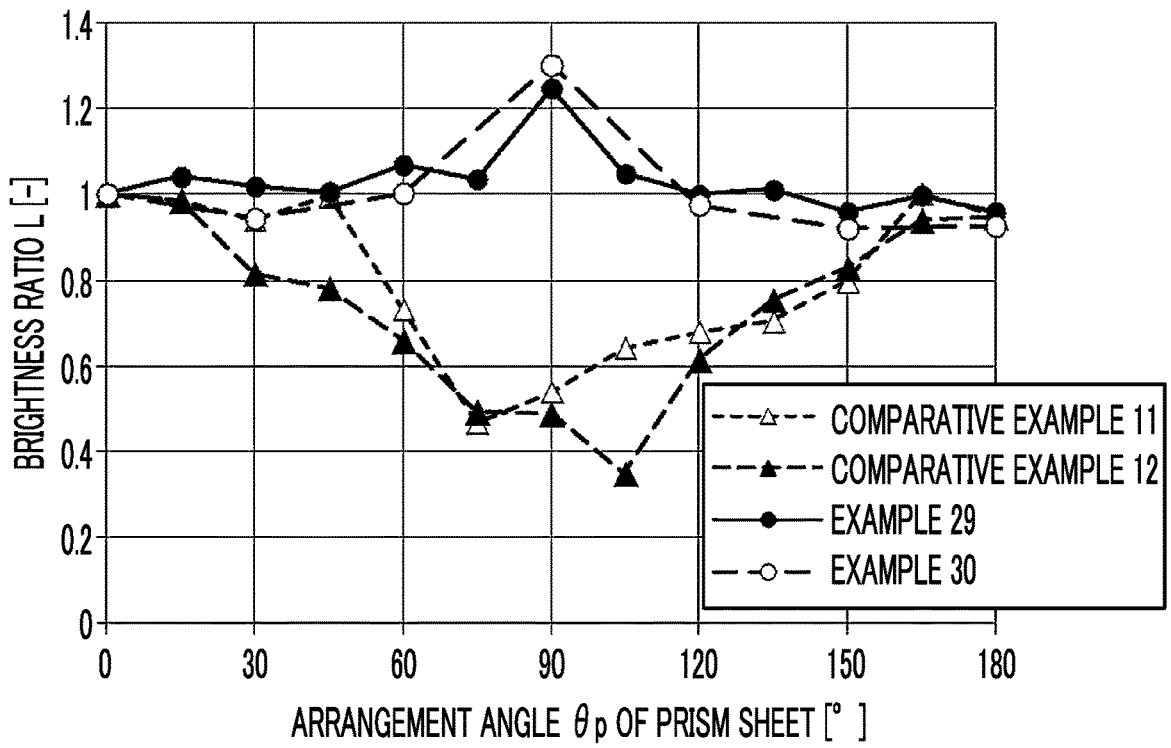
FIG. 18 is a graph illustrating a relationship between the arrangement angle of the prism sheet and a brightness ratio.

FIG. 18 illustrates a change in peak brightness in a case where θp was changed.

It can be seen that, in Comparative Examples 11 and 12, the peak brightness was decreased by the arrangement angle θp of the prism sheet. On the other hand, it can be seen that, in Examples 29 and 30 according to the present invention, there was substantially no change in peak brightness even in a case where the arrangement angle θp of the prism sheet was changed, and the brightness was able to be maintained irrespective of the arrangement angle of the prism sheet.

Figure 19:
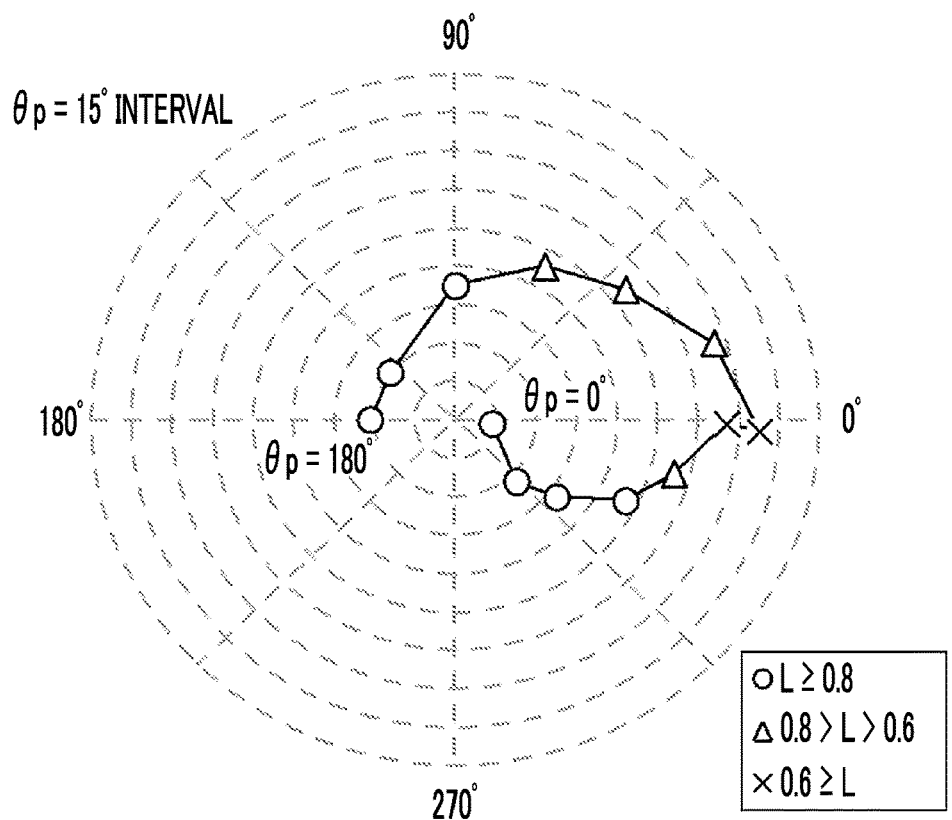
FIG. 19 is a graph illustrating a relationship between a peak brightness direction and a peak brightness ratio.
Figure 20:
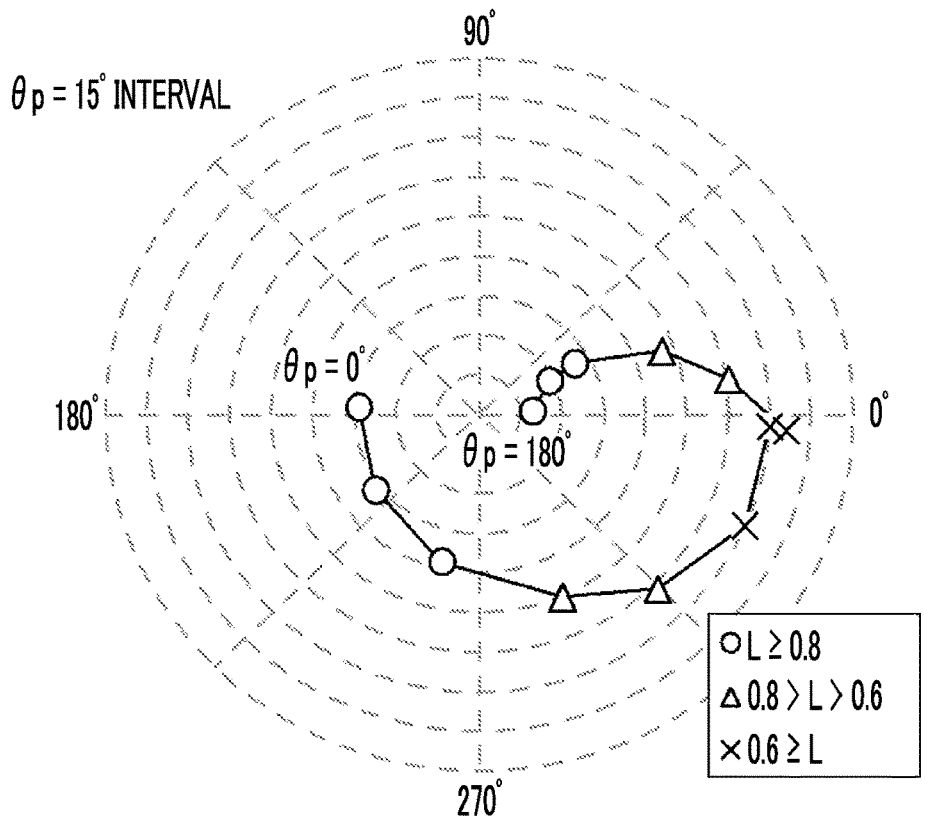
FIG. 20 is a graph illustrating a relationship between a peak brightness direction and a peak brightness ratio.
Figure 21:
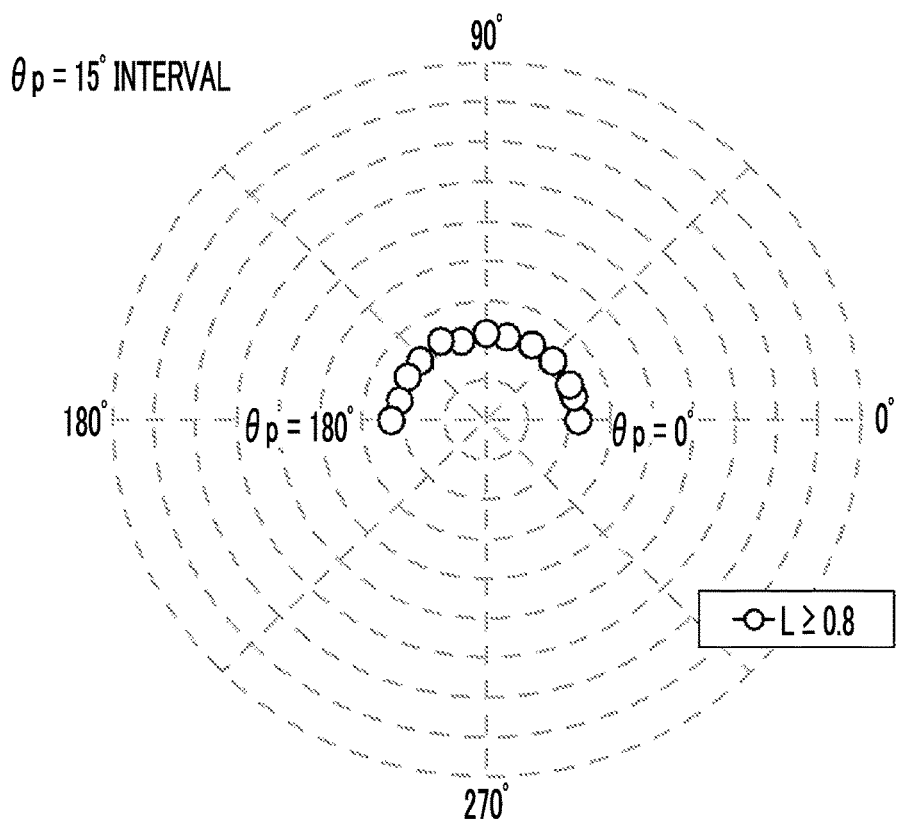
FIG. 21 is a graph illustrating a relationship between a peak brightness direction and a peak brightness ratio.
Figure 22:
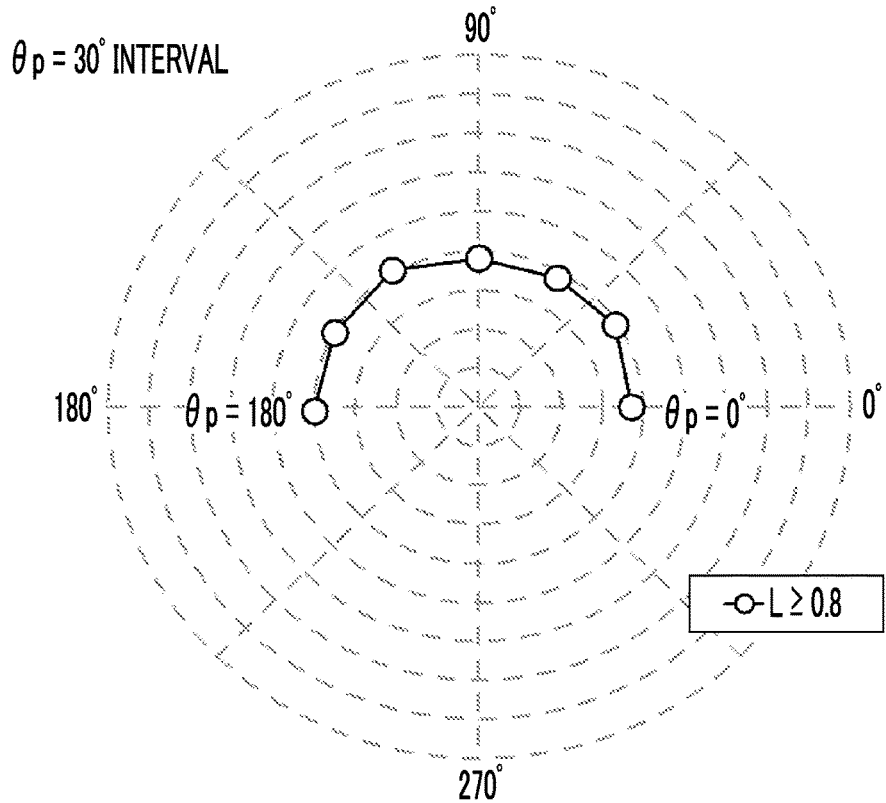
FIG. 22 is a graph illustrating a relationship between a peak brightness direction and a peak brightness ratio.

FIGS. 19 to 22 are contour diagrams illustrating positions of an azimuthal angle and a polar angle of the peak brightness in each of the examples in a case where the arrangement angle θp of the prism sheet was changed. FIG. 19 illustrates the results of Comparative Example 11, FIG. 20 illustrates the results of Comparative Example 12, FIG. 21 illustrates the results of Example 29, and FIG. 22 illustrates the results of Example 30. In addition, in the drawings, a position where the brightness ratio was 0.8 or higher was represented by "O", a position where the brightness ratio was higher than 0.6 and lower than 0.8 was represented by "Δ", and a position where the brightness ratio was 0.6 or lower was represented by "X".

It can be seen from FIGS. 19 and 20 that, in Comparative Examples 11 and 12, the position of the peak brightness changed on an asymmetric trajectory along with the change in the arrangement angle θp of the prism sheet. In addition, it can be seen that a region where the brightness ratio L was 0.8 or higher was limited to a specific azimuthal angle and a specific polar angle.

On the other hand, it can be seen from FIG. 21 that, in Example 29, only the azimuthal angle was changed along with the change in the arrangement angle θp of the prism sheet while maintaining the polar angle. In addition, it can be seen that a region where a change in the peak brightness was small and the brightness ratio L was 0.8 or higher was wide.

In addition, it can be seen from FIG. 22 that, in Example 30, even in a case where the prism shape was changed from that of Example 29, the same behavior as that of Example 29 was shown, and the directional angle of the backlight unit was able to be controlled in a wide range.

Example 31

A light-diffusion sheet (LSD20-PC-10-12) was arranged on a visible side of the prism sheet according to Example 30. The arrangement angle θp of the prism sheet was 0°.

Figure 23:
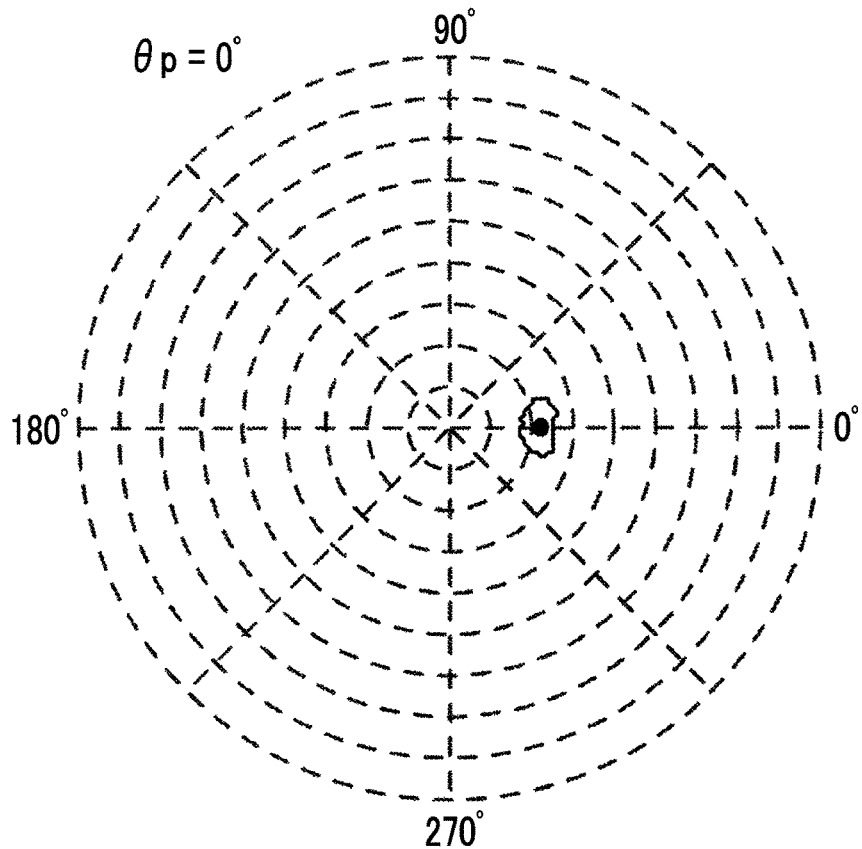
FIG. 23 is a graph illustrating a relationship between a peak brightness direction and a peak brightness ratio.
Figure 24:
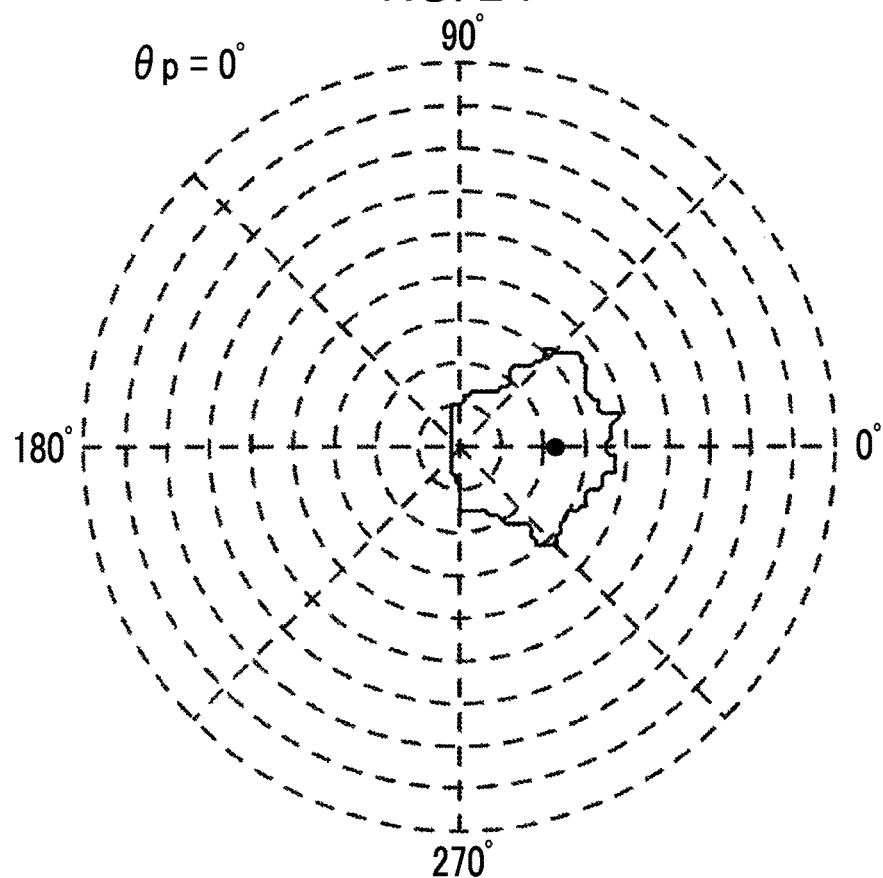
FIG. 24 is a graph illustrating a relationship between a peak brightness direction and a peak brightness ratio.

FIGS. 23 and 24 illustrate positions of the peak brightness of Examples 29 and 31 using black points, respectively, in which positions where L=0.5 are connected by a solid line. That is, a region surrounded by the solid line is a region where the brightness ratio L was 0.5 or higher. As can be seen from FIGS. 23 and 24, in the configuration according to Examples, the spreading width of light can also be increased without changing the position of the peak brightness by causing the light to pass through the diffusion sheet after controlling a light emission direction using the prism sheet.

Based on the above result, it can be seen that, in Examples, a light emission angle (azimuthal angle and polar angle) and the spreading width of light can be controlled in a wide range with the simple configuration.

Example 32

In order to obtain a direct backlight mode light source, a white LED (NSSW157T, manufactured by Nichia Corporation) was attached to a chip LED unit substrate (manufactured by Yajima Corporation) using a solder. These components were set as one set, and 63 sets in total including 9 sets crosswise and including 7 sets lengthwise are aligned to prepare a direct backlight mode light source. This direct backlight mode light source was arranged below the light guide plate of LL-M220 (manufactured by Sharp Corporation). Other components were arranged using the same method as that of Example 1. A display image in a case where only the side edge mode light source was lighted and a display image in a case where only the direct backlight mode light source was lighted were compared to each other in case of being seen from the front direction or at a polar angle 60 degrees. The display image in a case where only the side edge mode light source was lighted was able to be significantly clearly seen from the front direction but was not able to be seen at a polar angle of 60 degrees. On the other hand, in a case where only the direct backlight mode light source was lighted, the front brightness decreased, but the display image was able to be seen from the front direction and at a polar angle of 60 degrees.

As a result, the viewing angle of the display can be switched by switching between the light sources.

EXPLANATION OF REFERENCES

1: backlight unit
2: light collimating member
10: light source
11: substrate
12: light guide plate
13: adhesive layer
20: truncated cone
20a: surface of truncated cone opposite to transparent substrate
20c: slope of truncated cone
21: transparent substrate
22: lens
24: protrusion
26: light absorbing layer
26a: opening
30: liquid crystal display element
40: liquid crystal display device
50: prism sheet
52, 56: prism
54: substrate

What is claimed is:

1. A backlight unit comprising:
a light collimating member in which a lens array is formed on one surface of a transparent substrate and a plurality of truncated cones are arranged on another surface of the transparent substrate;
a light guide plate; and
a light source,
wherein the light collimating member is arranged to face one main surface of the light guide plate,
the light source is arranged to face at least one side surface of the light guide plate,
the truncated cone on the light collimating member has a shape in which a width decreases away from the transparent substrate in a height direction,
a position of each of lenses of the lens array deviates from a position of the truncated cone corresponding to the lens to move away from the light source in a direction that connects a center of the lens and the light source most adjacent to the lens,
an optical axis of the lens is arranged to pass through a slope of the truncated cone corresponding to the lens,
the light guide plate and a surface of the truncated cone opposite to the transparent substrate are in contact with each other, and
a shape of the truncated cone of the light collimating member satisfies the following Expressions 1 to 3, $$\frac{n2}{n1} \geq 1.03 \qquad \text{Expression 1}$$

$$\theta ave - 10° \leq \theta \leq \theta ave + 10° \qquad \text{Expression 2}$$

$$0.05 \leq \frac{r}{R} \leq 0.50 \qquad \text{Expression 3}$$

where n1 represents a refractive index of the light guide plate, n2 represents a refractive index of the truncated cone, θave represents a value represented by the following Expression 4, m in Expression 4 represents a division number of an incidence angle range of light incident from the light guide plate into the truncated cone, θi represents an i-th incidence angle in a case where the incidence angle range of the light incident from the light guide plate into the truncated cone is divided m times, θ represents an inclination angle of the truncated cone, R represents a radius of the lens on the transparent substrate side, and r represents a radius of the surface of the truncated cone opposite to the transparent substrate $$\theta ave = \frac{1}{m} \sum_{i=1}^{m} \left( 90 - \frac{1}{2} \cdot \frac{n1}{n2} \sin^{-1} \theta i \right). \qquad \text{Expression 4}$$

2. The backlight unit according to claim 1,
wherein the shape of the truncated cone of the light collimating member satisfies the following Expressions 5 and 6

$$\theta ave - 5° \leq \theta \leq \theta ave + 5° \qquad \text{Expression 5}$$

$$0.15 \leq \frac{r}{R} \leq 0.42. \qquad \text{Expression 6}$$

3. The backlight unit according to claim 1,
wherein a distance L between the optical axis of the lens of the light collimating member and a line perpendicular to the truncated cone corresponding to the lens satisfies the following Expression 7, $$r \leq L \leq r + \frac{1}{2} \cdot \frac{h}{\tan \theta} \qquad \text{Expression 7}$$

where θ represents an inclination angle of the truncated cone, h represents a height of the truncated cone, and r represents a radius of the surface of the truncated cone opposite to the transparent substrate.

4. The backlight unit according to claim 1,
wherein in a case where a thickness of the transparent substrate of the light collimating member is represented by d and a focal length of the lens is represented by f, Expression 8 is satisfied, $$d \leq f \leq d+h, \qquad \text{Expression 8,}$$

where h represents a height of the truncated cone.

5. The backlight unit according to claim 1,
wherein a light absorbing layer having an opening is provided between the truncated cone and the lens in the light collimating member, and
a center of the opening of the light absorbing layer and a position of the optical axis of the lens match each other.

6. The backlight unit according to claim 5,
wherein the opening of the light absorbing layer is circular, and
a diameter Rb of the opening satisfies Expression 9, $$0.15 < Rb/R \leq 1.0 \qquad \text{Expression 9.}$$

7. The backlight unit according to claim 1,
wherein the light guide plate and the surface of the truncated cone opposite to the transparent substrate are in contact with each other through an adhesive layer.

8. The backlight unit according to claim 7,
wherein a truncated conical or conical protrusion having a smaller inclination angle than the truncated cone is provided on the surface of the truncated cone of the light collimating member opposite to the transparent substrate, and a radius of a surface of the protrusion on the truncated cone side is equal to the radius of the surface of the truncated cone opposite to the transparent substrate.

9. The backlight unit according to claim 1,
wherein a plurality of lenses are randomly arranged.

10. The backlight unit according to claim 1,
wherein a light deflection member is arranged on a visible side further than the light collimating member.

11. The backlight unit according to claim 10,
wherein the light deflection member is a prism sheet.

12. A liquid crystal display device comprising:
the backlight unit according to claim 1.

* * * * *